(12) United States Patent
Huffman et al.

(10) Patent No.: US 10,861,476 B2
(45) Date of Patent: Dec. 8, 2020

(54) SYSTEM AND METHOD FOR BUILDING A VOICE DATABASE

(71) Applicant: Modulate, Inc., Cambridge, MA (US)

(72) Inventors: William Carter Huffman, Cambridge, MA (US); Michael Pappas, Cambridge, MA (US)

(73) Assignee: Modulate, Inc., Cambridge, MA (US)

( * ) Notice: Subject to any disclaimer, the term of this patent is extended or adjusted under 35 U.S.C. 154(b) by 156 days.

(21) Appl. No.: 15/989,065

(22) Filed: May 24, 2018

(65) Prior Publication Data
US 2018/0342257 A1 Nov. 29, 2018

Related U.S. Application Data

(60) Provisional application No. 62/510,443, filed on May 24, 2017.

(51) Int. Cl.
*G10L 21/00* (2013.01)
*G10L 21/013* (2013.01)
(Continued)

(52) U.S. Cl.
CPC ......... *G10L 21/013* (2013.01); *G10L 15/02* (2013.01); *G10L 15/063* (2013.01); *G10L 15/22* (2013.01);
(Continued)

(58) Field of Classification Search
CPC ....... G10L 13/033; G10L 19/02; G10L 19/08; G10L 21/038; G10L 21/04; G10L 25/27; G10L 25/90; G11B 27/031
See application file for complete search history.

(56) References Cited

U.S. PATENT DOCUMENTS

| 5,327,521 A | 7/1994 | Savic et al. |
| 5,677,989 A | 10/1997 | Rabin et al. |

(Continued)

FOREIGN PATENT DOCUMENTS

| CN | 107293289 | 10/2017 |
| KR | 101665882 | 10/2016 |
| KR | 101666930 | 10/2016 |

OTHER PUBLICATIONS

Mobin et al. "Voice Conversion using Convolutional Neural Networks." *2016 Machine Learning Summer School*, Abstract, 6 pages (Sep. 2018).

(Continued)

*Primary Examiner* — Vu B Hang
(74) *Attorney, Agent, or Firm* — Nutter McClennen & Fish LLP

(57) ABSTRACT

A timbre vector space construction system for building a timbre vector space has an input. The input is configured to receive a first speech segment in a first voice and a second speech segment in a second voice. The system also includes a temporal receptive field to transform the first speech segment into a first plurality of analytical segments, and the second speech segment into a second plurality of analytical segments. Each of the first plurality of smaller analytical segments, and each of the second plurality of analytical segments have a frequency distribution that represents a different portion of the timbre data of the respective voices. The system also includes a machine learning system configured to map the first voice relative to the second voice in the timbre vector space as a function of the frequency distribution of the first plurality of analytical segments the second plurality of analytical segments.

24 Claims, 19 Drawing Sheets
(7 of 19 Drawing Sheet(s) Filed in Color)

(51) Int. Cl.
  *G10L 15/02* (2006.01)
  *G10L 15/22* (2006.01)
  *G10L 15/06* (2013.01)
  *G10L 19/018* (2013.01)
  *G10L 25/30* (2013.01)

(52) U.S. Cl.
  CPC ............ *G10L 19/018* (2013.01); *G10L 25/30* (2013.01); *G10L 2015/025* (2013.01); *G10L 2021/0135* (2013.01)

(56) References Cited

U.S. PATENT DOCUMENTS

| | | | |
|---|---|---|---|
| 5,758,023 | A | 5/1998 | Bordeaux |
| 5,808,222 | A | 9/1998 | Yang |
| 6,161,091 | A | 12/2000 | Akamine et al. |
| 6,307,140 | B1 | 10/2001 | Iwamoto |
| 7,117,154 | B2 | 10/2006 | Yoshioka et al. |
| 7,412,377 | B2 | 8/2008 | Monkowski |
| 7,634,410 | B2 | 12/2009 | Lemoine et al. |
| 7,664,645 | B2 | 2/2010 | Hain et al. |
| 7,987,244 | B1 | 7/2011 | Lewis et al. |
| 8,131,550 | B2 | 3/2012 | Nurminen et al. |
| 9,009,052 | B2 | 4/2015 | Nakano et al. |
| 9,135,923 | B1 | 9/2015 | Chen |
| 9,153,235 | B2 | 10/2015 | Zhang et al. |
| 9,183,830 | B2 | 11/2015 | Agiomyrgiannakis |
| 9,305,530 | B1 | 4/2016 | Durham et al. |
| 9,532,136 | B2 | 12/2016 | Uhle et al. |
| 9,589,574 | B1 | 3/2017 | Klimanis et al. |
| 9,800,721 | B2 | 10/2017 | Gainsboro et al. |
| 10,186,251 | B1 | 1/2019 | Mohammadi |
| 10,361,673 | B1 | 7/2019 | Matsukawa |
| 2001/0044721 | A1 | 11/2001 | Yoshioka et al. |
| 2002/0072900 | A1 | 6/2002 | Keough et al. |
| 2002/0086653 | A1 | 7/2002 | Kim |
| 2003/0158734 | A1 | 8/2003 | Cruickshank |
| 2005/0064374 | A1 | 3/2005 | Spector |
| 2006/0210956 | A1 | 9/2006 | Okamoto |
| 2006/0268007 | A1 | 11/2006 | Gopalakrishnan |
| 2008/0243511 | A1 | 10/2008 | Fujita et al. |
| 2008/0269633 | A1 | 10/2008 | Watson |
| 2009/0094027 | A1 | 4/2009 | Nurminen et al. |
| 2010/0082326 | A1 | 4/2010 | Bangalore et al. |
| 2011/0161348 | A1 | 6/2011 | Oron |
| 2012/0116756 | A1 | 5/2012 | Kalinli |
| 2012/0166187 | A1 | 6/2012 | Van Buskirk et al. |
| 2012/0253812 | A1 | 10/2012 | Kalinli et al. |
| 2013/0025437 | A1 | 1/2013 | Serletic et al. |
| 2013/0151256 | A1 | 6/2013 | Nakano et al. |
| 2013/0203027 | A1 | 8/2013 | De Villers-Sidani et al. |
| 2014/0046660 | A1 | 2/2014 | Kamdar |
| 2014/0088958 | A1 | 3/2014 | Chen |
| 2014/0114655 | A1 | 4/2014 | Kalinli-Akbacak |
| 2014/0149112 | A1 | 5/2014 | Kalinli-Akbacak |
| 2014/0180673 | A1 | 6/2014 | Neuhauser et al. |
| 2014/0180675 | A1 | 6/2014 | Neuhauser et al. |
| 2014/0195242 | A1 | 7/2014 | Chen |
| 2014/0200889 | A1 | 7/2014 | Chen |
| 2015/0005661 | A1 | 1/2015 | Trammell |
| 2015/0025892 | A1 | 1/2015 | Lee et al. |
| 2015/0063573 | A1 | 3/2015 | Daly |
| 2015/0127350 | A1 | 5/2015 | Agiomyrgiannakis |
| 2015/0255074 | A1 | 9/2015 | Jeong et al. |
| 2015/0356967 | A1 | 12/2015 | Byron et al. |
| 2015/0379752 | A1 | 12/2015 | Li et al. |
| 2016/0036961 | A1 | 2/2016 | Lee |
| 2016/0260425 | A1 | 9/2016 | Saino et al. |
| 2016/0379641 | A1 | 12/2016 | Liu et al. |
| 2017/0142548 | A1 | 5/2017 | Buskirk et al. |
| 2017/0149961 | A1 | 5/2017 | Kim et al. |
| 2018/0040324 | A1 | 2/2018 | Wilberding |
| 2018/0097841 | A1 | 4/2018 | Stolarz et al. |
| 2018/0137875 | A1 | 5/2018 | Liu et al. |
| 2018/0146370 | A1 | 5/2018 | Krishnaswamy et al. |
| 2018/0182397 | A1 | 6/2018 | Carbune et al. |
| 2018/0225083 | A1 | 8/2018 | Barkley et al. |
| 2018/0277113 | A1 | 9/2018 | Hartung et al. |
| 2018/0342256 | A1 | 11/2018 | Huffman et al. |
| 2018/0342258 | A1 | 11/2018 | Huffman et al. |
| 2019/0051276 | A1 | 2/2019 | Lathrop et al. |

OTHER PUBLICATIONS

International Search Report, dated Sep. 25, 2018, US Patent Office, International Patent Application PCT/US2018/034485, *together with the Written Opinion of the International Searching Authority*, 13 pages.
Arik et al., "Neural Voice Cloning with a Few Samples," arXiv:1802.06006 [cs.CL], 17 pages, Mar. 20, 2018.
Arjovsky et al., "Wasserstein GAN," arXiv:1701.07875 [stat.ML], 32 pages, Dec. 6, 2017.
De Brébisson et al., "Create a digital copy of your voice with one minute of audio," Lyrebird, https://lyrebird.ai, 1 page showing URL provided, 2017.
Goodfellow et al., "Generative Adversarial Nets," arXiv:1406.2661 [stat.ML], 9 pages, Jun. 10, 2014.
Gulrajani et al., "Improved Training of Wasserstein GANs," arXiv:1704.00028 [cs.LG], 20 pages, Dec. 25, 2017.
Hong, "RNN GAN Based General Voice Conversion-Pitch," Youtube, Retrieved from https://www.youtube.com/watch?v=ULWL1eBDCEY, 1 page showing URL provided, Jan. 12, 2018.
Hsu et al., "Voice Conversion from Unaligned Corpora using Variational Autoencoding Wasserstein Generative Adversarial Networks," arXiv:1704.00849 [cs.CL], 5 pages, Jun. 8, 2017.
Kaneko et al., "Sequence-to-Sequence Voice Conversion with Similarity Metric Learned Using Generative Adversarial Networks," INTERSPEECH 2017, pp. 1283-1287, Aug. 2017.
Kaneko et al., "Parallel-Data-Free Voice Conversion Using Cycle-Consistent Adversarial Networks," arXiv:1711.11293 [stat.ML], 5 pages, Dec. 20, 2017.
Lorenzo-Trueba et al., "Can we steal your vocal identity from the Internet?: Initial of cloning Obama's voice using GAN, WaveNet and low-quality found data," arXiv:1803.00860 [eess.AS], 8 pages, Mar. 2, 2018.
Mobin et al., "Voice Conversion using Convolutional Neural Networks," arXiv:1704.00849 [cs.CL], 6 pages, Oct. 27, 2016.
Nachmani et al., "Fitting New Speakers Based on a Short Untranscribed Sample," arXiv:1802.06984 [cs.LG], 9 pages, Feb. 20, 2018.
Oyamada et. al., "Non-native speech conversion with consistency-aware recursive network and generative adversarial network," Proceedings of APSIPA Annual Summit and Conference, 7 pages, Dec. 2017.
Sallmans et al., "Improved Techniques for Training GANs," arXiv:1606.03498 [cs.LG], 10 pages, Jun. 10, 2016.

SYSTEM AND METHOD FOR BUILDING A VOICE DATABASE

PRIORITY

This patent application claims priority from provisional U.S. patent application No. 62/510,443, filed May 24, 2017, entitled, "TIMBRE TRANSFER SYSTEMS AND METHODS UTILIZING ADVERSARIAL NEURAL NETWORKS," and naming William C. Huffman as inventor, the disclosure of which is incorporated herein, in its entirety, by reference.

FIELD OF THE INVENTION

The invention generally relates to voice conversion and, more particularly, the invention relates to generating synthetic voice profiles.

BACKGROUND OF THE INVENTION

Interest in voice technology has recently peaked because of the use of personal voice-activated assistants, such as Amazon Alexa, Siri by Apple, and Google Assistant. Furthermore, podcasts and audiobook services have also recently been popularized.

SUMMARY OF VARIOUS EMBODIMENTS

In accordance with one embodiment of the invention, a timbre vector space construction system for building a timbre vector space includes an input. The input is configured to receive a) a first speech segment, including first timbre data, in a first voice and b) a second speech segment, including second timbre data, in a second voice. The system also includes a temporal receptive field to transform the first speech segment into a first plurality of smaller analytical audio segments. Each of the first plurality of smaller analytical audio segments has a frequency distribution representing a different portion of the first timbre data. The filter also is configured to use the temporal receptive field to transform the second speech segment into a second plurality of smaller analytical audio segments. Each of the second plurality of smaller analytical audio segments has a frequency distribution representing a different portion of the second timbre data. The system also includes a machine learning system configured to map the first voice relative to the second voice in the timbre vector space. The voices are mapped as a function of the frequency distribution of a) the first plurality of analytical audio segments from the first speech segment and b) the second plurality of analytical audio segments from the second speech segment.

The database is also configured to receive a third speech segment in a third voice. The machine learning system is configured to filter, using a temporal receptive field, the third speech segment into a plurality of smaller analytical audio segments and to map the third voice relative to the first voice and the second voice in the vector space. Mapping the third voice relative to the first voice and the second voice changes the relative position of the first voice to the second voice in the vector space.

Among other things, the system is configured to map each human phoneme in the English language in at least one voice. The receptive field is sufficiently small so as not to capture speech rate and/or accent of the voice. For example, the temporal receptive field may be between about 10 milliseconds and about 2,000 milliseconds.

In accordance with another embodiment, a method for constructing a timbre vector space for transforming speech segments includes receiving a) a first speech segment in a first voice and a second speech segment in a second voice. Both the first speech segment and the second speech segment include timbre data. The method filters each of the first speech segment and the second speech segment into a plurality of smaller analytical audio segments using a temporal receptive field. Each analytical audio segment has a frequency distribution representing the timbre data. The method also maps the first voice relative to the second voice in a vector space as a function of the frequency distribution in at least one of the plurality of analytical audio segments from the first speech segment and the second speech segment.

In some embodiments, the method includes means for filtering each of the first speech segment and the second speech segment and/or means for mapping the first voice relative to the second voice. The filtering may be performed by a machine learning system.

Additionally, the method may receive a third speech segment in a third voice, and filter the third speech segment into a plurality of smaller analytical audio segments using a temporal receptive field. The third voice may be mapped in the vector space relative to the first voice and the second voice. The relative position of the first voice to the second voice may be adjusted in the vector space as a function of mapping the third voice.

In accordance with another embodiment, a timbre vector space construction system for building a timbre vector space includes an input configured to receive a) a first speech segment, including first timbre data, in a first voice and b) a second speech segment, including second timbre data, in a second voice. The system also includes means for filtering a) the first speech segment into a first plurality of smaller analytical audio segments that have a frequency distribution representing a different portion of the first timbre data, and b) the second speech segment into a second plurality of smaller analytical audio segments, each of the second plurality of smaller analytical audio segments having a frequency distribution representing a different portion of the second timbre data. Furthermore, the system has means for mapping the first voice relative to the second voice in the timbre vector space as a function of the frequency distribution of a) the first plurality of analytical audio segments from the first speech segment and b) the second plurality of analytical audio segments from the second speech segment.

BRIEF DESCRIPTION OF THE DRAWINGS

The patent or application file contains at least one drawing executed in color. Copies of this patent with color drawing(s) will be provided by the Patent and Trademark Office upon request and payment of necessary fee.

Those skilled in the art should more fully appreciate advantages of various embodiments of the invention from the following "Description of Illustrative Embodiments," discussed with reference to the drawings summarized immediately below.

FIG. 5A shows the spectrogram for the "a" phone in the word "Call."

FIG. 5B shows the spectrogram for the "a" phone in "Stella." FIG. 5C shows the spectrogram for the "ea" phone in "Please."

FIG. 6A schematically shows a slice of the vector space mapping only the target voice for the phone shown in FIG. 5B.

FIG. 6B schematically shows the slice of the vector space of FIG. 6A mapping the target voice and a second voice.

FIG. 6C schematically shows the slice of the vector space of FIG. 6A mapping the target voice, the second voice, and a third voice.

FIG. 6D schematically shows the slice of the vector space of FIG. 6A mapping a plurality of voices.

DESCRIPTION OF ILLUSTRATIVE EMBODIMENTS

In illustrative embodiments, a voice-to-voice conversion system enables the real-time, or near real-time, transformation of a speech segment spoken in a source voice into a target voice. To those ends, the system has a voice feature extractor that receives speech samples from a plurality of voices and extracts frequency components associated with each sound made by each voice. The voices are mapped in a vector space relative to one another on the basis of the extracted frequency components, which enables extrapolation of synthetic frequency components for sounds not provided in the speech samples. The system has machine learning that is further configured to compare the target voice against other voices, and to refine the synthetic frequency components to optimally mimic the voice. Accordingly, users of the system can input the speech segment, select the target voice, and the system transforms the speech segment into the target voice.

Figure 1:
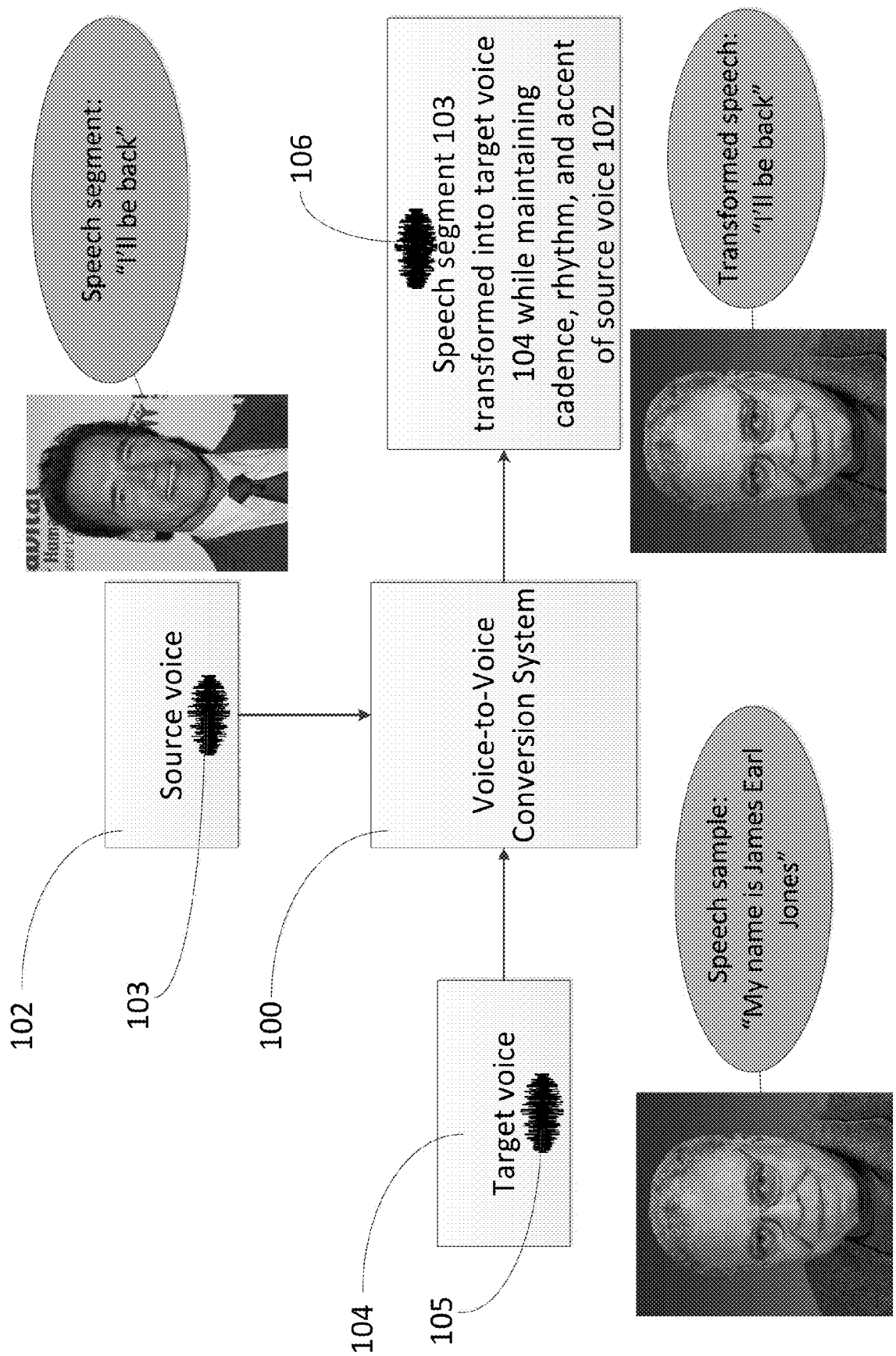
FIG. 1 schematically shows a simplified version of the voice-to-voice conversion system in accordance with illustrative embodiments of the invention.

FIG. 1 schematically shows a simplified version of the voice-to-voice conversion system 100 in accordance with illustrative embodiments of the invention. Among other things, the system 100 allows a user to convert their voice (or any other voice) into a target voice 104 of their choice. More specifically, the system 100 converts the user's speech segment 103 into the target voice 104. Accordingly, the user's voice in this example is referred to as a source voice 102, because the system 100 transforms the speech segment 103, spoken in the source voice 102, into the target voice 104. The result of the transformation is a transformed speech segment 106. Although the source voice 102 is shown as a human speaker (e.g., Arnold), in some embodiments the source voice 102 may be a synthesized voice.

The transformation of voices is also referred to as timbre conversion. Throughout the application, "voice" and "timbre" are used interchangeably. The timbre of the voices allows listeners to distinguish and identify particular voices that are otherwise speaking the same words at the same pitch, accent, amplitude, and cadence. Timbre is a physiological property resulting from the set of frequency components a speaker makes for a particular sound. In illustrative embodiments, the timbre of the speech segment 103 is converted to the timbre of the target voice 104, while maintaining the original cadence, rhythm, and accent/pronunciation of the source voice 102.

As an example, Arnold Schwarzenegger may use the system 100 to convert his speech segment 103 (e.g., "I'll be back") into the voice/timbre of James Earl Jones. In this example, Arnold's voice is the source voice 102 and James' voice is the target voice 104. Arnold may provide a speech sample 105 of James' voice to the system 100, which uses the speech sample 105 to transform his speech segment (as described further below). The system 100 takes the speech segment 103, transforms it into James' voice 104, and outputs the transformed speech segment 106 in the target voice 104. Accordingly, the speech segment 103 "I'll be back" is output in James' voice 104. However, the transformed speech segment 106 maintains the original cadence, rhythm, and accent. Thus, the transformed speech segment 106 sounds like James is trying to imitate Arnold's accent/pronunciation/cadence and speech segment 103. In other words, the transformed speech segment 106 is the source speech segment 103 in James' timbre. Details of how the system 100 accomplishes this transformation are described below.

Figure 2:
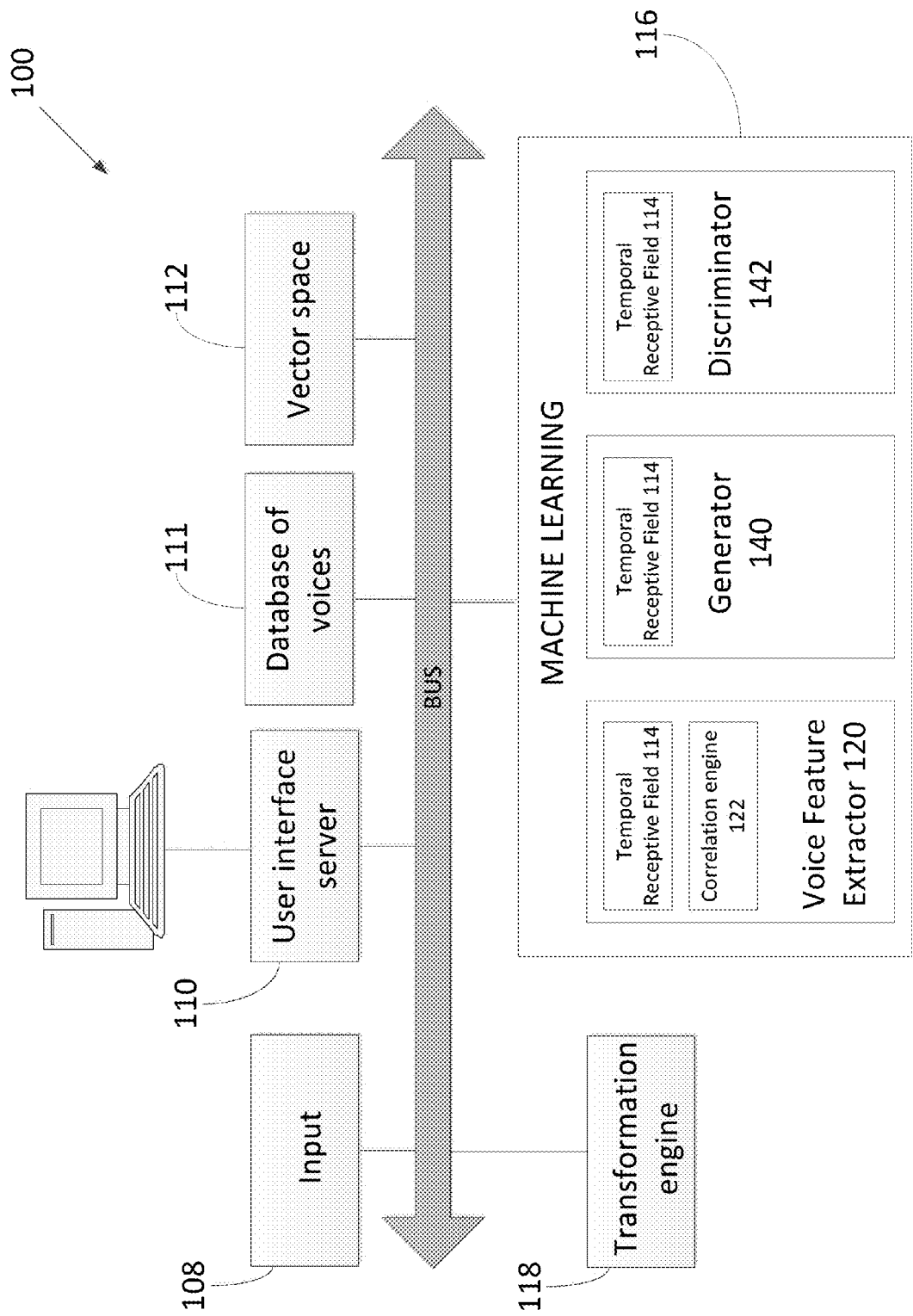
FIG. 2 schematically shows details of the system implementing illustrative embodiments of the invention.

FIG. 2 schematically shows details of the system 100 implementing illustrative embodiments of the invention. The system 100 has an input 108 configured to receive audio files, e.g., the speech sample 105 in the target voice 104 and the speech segments 103 from the source voice 102. It should be understood that while different terms are used for "speech segment 103" and "speech sample 105," both may include spoken words. The terms "speech sample 105" and "speech segment 103" are merely used to indicate source, and the system 100 does different transformations with each of these audio files. "Speech sample 105" refers to speech inputted into the system 100 in the target voice 104. The system 100 uses the speech sample 105 to extract the frequency components of the target voice 104. On the other hand, the system 100 transforms the "speech segment 103" from the source voice 102 into the target voice 104.

The system 100 has a user interface server 110 configured to provide a user interface through which the user may communicate with the system 100. The user may access the user interface via an electronic device (such as a computer, smartphone, etc.), and use the electronic device to provide the speech segment 103 to the input 108. In some embodiments, the electronic device may be a networked device, such as an internet-connected smartphone or desktop computer. The user speech segment 103 may be, for example, a sentence spoken by the user (e.g., "I'll be back"). To that end, the user device may have an integrated microphone or an auxiliary microphone (e.g., connected by USB) for recording the user speech segment 103. Alternatively, the user may upload a pre-recorded digital file (e.g., audio file) that contains the user speech segment 103. It should be understood that the voice in the user speech segment 103 does not necessarily have to be the user's voice. The term "user speech segment 103" is used as a matter of convenience to denote a speech segment provided by the user that the system 100 transforms into a target timbre. As described earlier, the user speech segment 103 is spoken in the source voice 102.

The input 108 is also configured to receive the target voice 104. To that end, the target voice 104 may be uploaded to the system 100 by the user, in a manner similar to the speech segment 103. Alternatively, the target voice 104 may be in a database of voices 111 previously provided to the system 100. As will be described in further detail below, if the target voice 104 is not already in the database of voices 111, the system 100 processes the voice 104 using a transformation engine 118 and maps it in a multi-dimensional discrete or continuous space 112 that represents encoded voice data. The representation is referred to as "mapping" the voices. When the encoded voice data is mapped, the vector space 112 makes characterizations about the voices and places them relative to one another on that basis. For example, part of the representation may have to do with pitch of the voice, or gender of the speaker.

Illustrative embodiments filter the target voice 104 into analytical audio segments using a temporal receptive filter 114 (also referred to as temporal receptive field 114), the transformation engine 118 extracts frequency components from the analytical audio segments, a machine learning system 116 maps a representation of the target voice 104 in the vector space 112 (e.g., using a voice feature extractor 120) when the target voice 104 is first received by the input 108, and the machine learning system 116 refines the mapped representation of the target voice 104. The system 100 can then be used to transform speech segments 103 into the target voice 104.

Specifically, in illustrative embodiments, the system 100 partitions the target 104 speech sample 105 into (potentially overlapping) audio segments, each with a size corresponding to the temporal receptive field 114 of a voice feature extractor 120. The voice feature extractor 120 then operates on each analytical audio segment individually, each of which may contain a sound (such as a phone, phoneme, part of a phone, or multiple phones) made by the target in the target speaker's voice 104.

In each analytical audio segment, the voice feature extractor 120 extracts features of the target speaker's voice 104 and maps the voices in the vector space 112 on the basis of those features For example, one such feature might be a bias towards amplifying some amplitudes of several frequencies used to produce some vowel sounds, and the method of extraction could identify that the sound in the segment as a particular vowel sound, compare the amplitudes of the expressed frequencies to those used by other voices to produce similar sounds, and then encode the difference in this voice's frequencies compared to a particular set of similar voices that the voice feature extractor 120 has previously been exposed to as the feature. These features are then combined together to refine the mapped representation of the target voice 104.

In illustrative embodiments, the system 100 (the voice feature extractor 120 along with the combination at the end) may be considered a machine learning system. One implementation may include a convolutional neural network as the voice feature extractor 120, and a recurrent neural network to combine the extracted features at the end. Other examples may include a convolutional neural network along with a neural network with an attention mechanism at the end, or a fixed-sized neural network at the end, or simple addition of the features at the end.

The voice feature extractor 120 extracts relationships between amplitudes in the frequencies of target speech sample 105 (e.g., relative amplitudes of formants and/or attack and decay of formats). By doing so, the system 100 is learning the target's timbre 104. In some embodiments, the voice feature extractor 120 may optionally include a frequency-to-sound correlation engine 122 that correlates the frequency components in a particular analytical audio segment with a particular sound. Although a frequency-to-sound correlation engine 122 is described above as being used to map the target voice 104, a person of skill in the art understands that the machine learning system 116 may use additional, or alternative, methods to map voices. Thus, the discussion of this particular implementation is merely intended as an example to facilitate discussion, and not intended to limit all illustrative embodiments.

Each of the above-described components is operatively connected by any conventional interconnect mechanism. FIG. 2 simply shows a bus communicating each of the components. Those skilled in the art should understand that this generalized representation can be modified to include other conventional direct or indirect connections. Accordingly, discussion of a bus is not intended to limit various embodiments.

Indeed, it should be noted that FIG. 2 only schematically shows each of these components. Those skilled in the art should understand that each of these components can be implemented in a variety of conventional manners, such as by using hardware, software, or a combination of hardware and software, across one or more other functional components. For example, the voice extractor 112 may be implemented using a plurality of microprocessors executing firmware. As another example, the machine learning system 116 may be implemented using one or more application specific integrated circuits (i.e., "ASICs") and related software, or a combination of ASICs, discrete electronic components (e.g., transistors), and microprocessors. Accordingly, the representation of the machine learning system 116 and other components in a single box of FIG. 2 is for simplicity purposes only. In fact, in some embodiments, the machine learning system 116 of FIG. 2 is distributed across a plurality of different machines—not necessarily within the same housing or chassis. Additionally, in some embodiments, components shown as separate (such as the temporal receptive fields 114 in FIG. 2) may be replaced by a single component (such as a single temporal receptive field 115 for the entire machine learning system 116) Furthermore, certain components and sub-components in FIG. 2 are optional. For example, some embodiments may not use the correlation engine. As another example, in some embodiments, the generator 140, the discriminator 142, and/or the voice feature extractor 120 may not have a receptive field 114.

It should be reiterated that the representation of FIG. 2 is a significantly simplified representation of an actual voice-to-voice conversion system 100. Those skilled in the art should understand that such a device may have other physical and functional components, such as central processing units, other packet processing modules, and short-term memory. Accordingly, this discussion is not intended to suggest that FIG. 2 represents all of the elements of a voice-to-voice conversion system 100.

Figure 3:
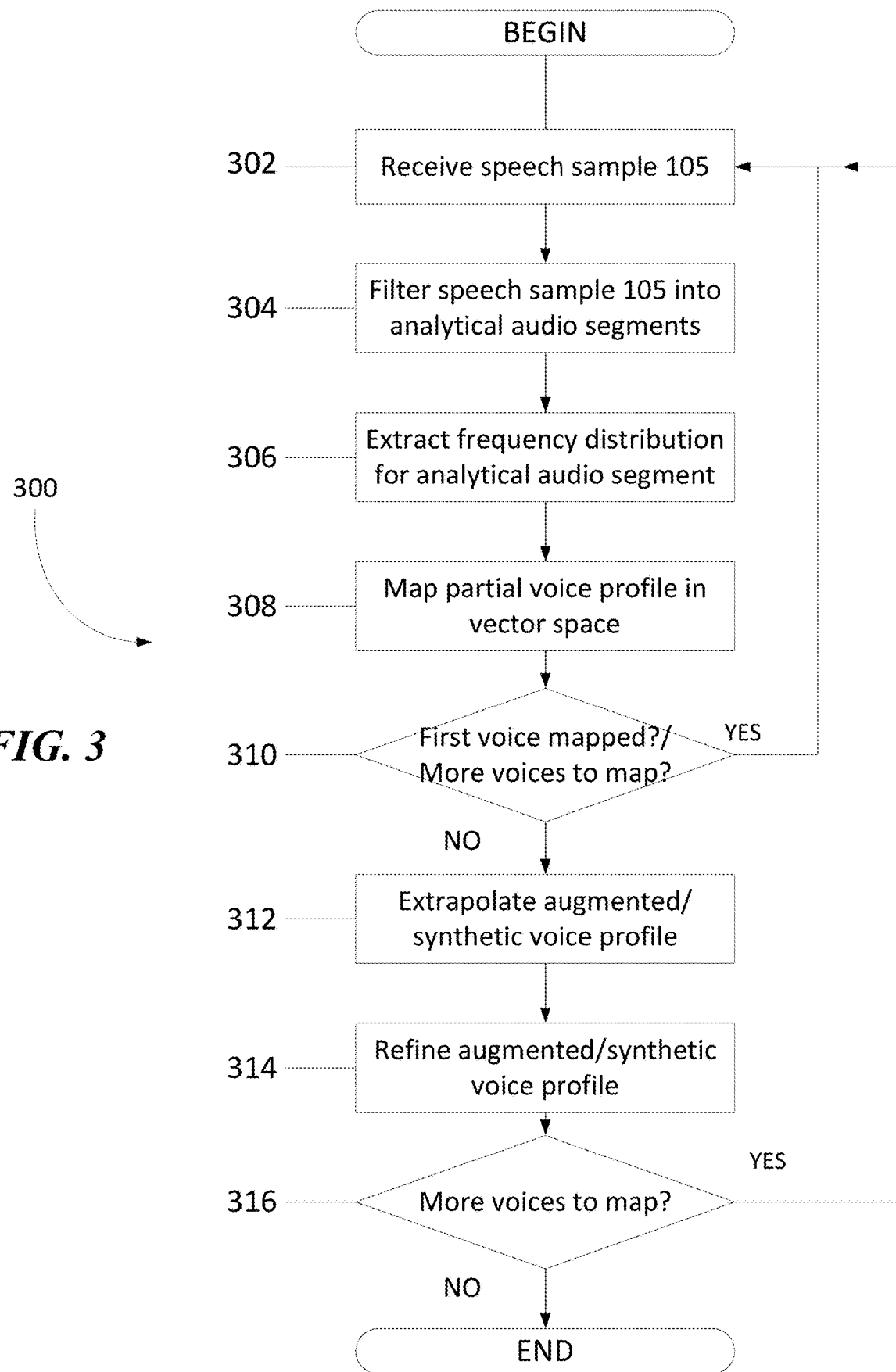
FIG. 3 shows a process for building a multi-dimensional space that represents encoded voice data in accordance with illustrative embodiments of the invention.

FIG. 3 shows a process 300 for building the multi-dimensional discrete or continuous vector space 112 that represents encoded voice data in accordance with illustrative embodiments of the invention. It should be noted that this process is substantially simplified from a longer process that normally would be used to build the vector space 112. Accordingly, the process of building the vector space 112 may have many steps that those skilled in the art likely would use. In addition, some of the steps may be performed in a different order than that shown, or at the same time. Those skilled in the art therefore can modify the process as appropriate.

The process of FIG. 3 begins at step 302, which receives speech sample 105, which is in the target timbre 104. As described previously, the speech sample 105 is received by the input 108, and may be provided to the system 100 by the user of the system 100. In some embodiments, the system 100 may be provided with voices already mapped in the vector space 112. Voices that are already mapped in the vector space 112 have already undergone the process that is described below. The vector space 112 is described in further detail below.

Figure 4:
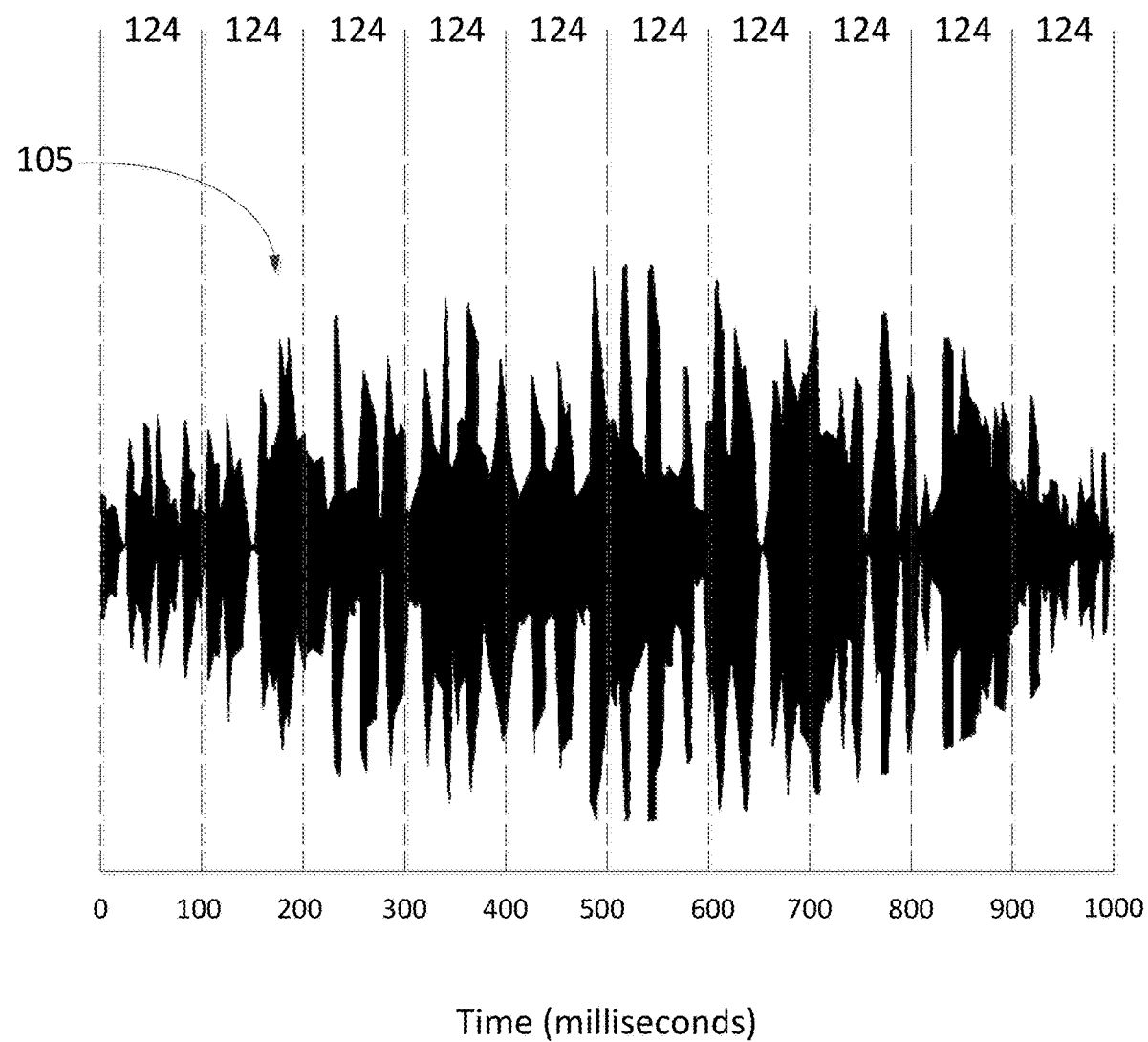
FIG. 4 schematically shows a temporal receptive filter filtering a speech sample in accordance with illustrative embodiments of the invention.

FIG. 4 schematically shows an exemplary temporal receptive filter 114 filtering the speech sample 105 in accordance with illustrative embodiments of the invention. The process continues to step 304, where the speech sample 105 is filtered into the analytical audio segments 124 by the temporal receptive filter 114. The speech sample 105 in this example is a 1-second recorded audio signal in the target voice 104. The speech sample 105 may be shorter or longer than 1-second, but for reasons discussed below, some embodiments may use a longer length for the speech sample 105. The temporal receptive filter 114 in this example is set to 100-milliseconds. Accordingly, the 1-second speech sample 105 is broken down into ten 100-millisecond analytical audio segments 124 by the filter 114.

Although the temporal receptive filter 114 is shown as being set to filter 100-millisecond intervals, it should be understood that a variety of filtering intervals may be set within parameters as discussed below. The discussion of the temporal receptive field 114 (or filter 114) relates to any or all parts of the machine learning 116 (e.g., the generator 140, the discriminator 142, and/or the feature extractor 120). In illustrative embodiments, the filtering interval is greater than 0-milliseconds and less than 300-milliseconds. In some other embodiments, the temporal receptive field 114 is less than 50-milliseconds, 80-milliseconds, 100-milliseconds, 150 milliseconds, 250 milliseconds, 400 milliseconds, 500-milliseconds, 600-milliseconds, 700-milliseconds, 800-milliseconds, 900-milliseconds, 1000-milliseconds, 1500-milliseconds, or 2000-milliseconds. In further embodiments, the temporal receptive field 114 is greater than 5-milliseconds, 10-milliseconds, 15-milliseconds, 20-milliseconds, 30-milliseconds, 40-milliseconds, 50-milliseconds, or 60-milliseconds. Although shown as a separate component in FIG. 2, the temporal receptive filter 114 may be built into the input 108 as a temporal receptive field 114. Furthermore, the machine learning system 116 may have a single receptive field 114 (e.g., instead of the three individual receptive fields 114 shown).

Each analytical audio segment 124 contains frequency data (that is extracted in step 306) for a particular sound or sounds made by the specific target voice 104. Accordingly, the shorter the analytical audio segment 124, the more particular the frequency data (e.g., the distribution of frequencies) is to a specific sound. However, if the analytical audio segment 124 is too short, it is possible that certain low frequency sounds may be filtered out by the system 100. In preferred embodiments, the temporal filter 114 is set to capture the smallest distinguishable discrete segment of sound in the stream of speech sample 105. The smallest distinguishable discrete segment of sound is referred to as a phone. From a technical perspective, the analytical audio segment 124 should be short enough to capture the formant characteristics of the phone. Illustrative embodiments may filter analytical audio segments to between about 60 milliseconds and about 250 milliseconds.

Humans generally are able to hear sounds in the 20 Hz to 20 kHz range. Lower frequency sounds have a longer period than higher frequency sounds. For example, a sound wave with a 20 Hz frequency takes 50 milliseconds for a full period, while a sound wave with a 2 kHz frequency takes 0.5 milliseconds for a full period. Thus, if the analytical audio segment 124 is very short (e.g., 1 millisecond), it is possible that the analytical audio segment 124 may not include enough of the 20 Hz sound to be detectable. However, some embodiments may detect lower frequency sounds using predictive modeling (e.g., using only a portion of the low-frequency sound wave). Illustrative embodiments may filter out or ignore some lower frequency sounds and still contain sufficient frequency data to accurately mimic the timbre of the target voice 104. Accordingly, the inventors believe that analytical audio segments 124 as short as about 10 milliseconds are sufficient for the system 100 to adequately predict frequency characteristics of phones.

The fundamental frequency in human speech is generally on the order of greater than 100 Hz. Fundamental frequency is part of the timbre, but is not the timbre itself. If human voices only differed in their fundamental frequency, voice conversion would essentially be pitch-shifting—the equivalent of playing the same song an octave lower on the piano. But timbre is also the quality that makes a piano and a trumpet sound different playing the same note—it is the collection of all the little additional variations in frequency, none of which are at as high an amplitude as the fundamental frequency (usually), but which do contribute significantly to the overall feel of the sound.

While the fundamental frequency may be important to timbre, it alone is not the sole indicator of timbre. Consider the case where both Morgan Freeman and the target voice 104 can hit some of the same notes, in the same octave. These notes implicitly have the same fundamental frequency, but the target voice 104 and Morgan Freeman can have different timbres, and thus, fundamental frequency alone is not sufficient to identify a voice.

The system 100 ultimately creates a voice profile for the target voice 104 on the basis of the frequency data from the analytical audio segments 124. Thus, in order to have frequency data corresponding to a particular phone, the temporal receptive filter 114 preferably filters the analytical audio segments 124 approximately to the time it takes to pronounce the smallest distinguishable phone. Because different phones may have different temporal lengths (i.e., the amount of time it takes to enunciate the phone), illustrative embodiments may filter analytical audio segments 124 to a length that is greater than the time it takes to enunciate the longest phone made in human languages. In illustrative embodiments, the temporal floor set by the filter 114 allows the analytical audio segment 124 to contain frequency information relating to at least the entirety of a single phone. The inventors believe that breaking the speech into 100-millisecond analytical audio segments 124 is sufficiently short to correspond to most phones made by human voices. Thus, respective analytical audio segments 124 contain frequency distribution information corresponding to certain sounds (e.g., phones) made by the target voice 104 in the speech sample 105.

On the other hand, illustrative embodiments may also have a ceiling for the temporal receptive field 114. For example, illustrative embodiments have a receptive field 114 that is short enough to avoid capturing more than one complete phone at a time. Furthermore, if the temporal receptive field 114 is large (e.g., greater than 1 second), the analytical audio segments 124 may contain accent and/or cadence of the source 102. In some embodiments, the temporal receptive field 114 is short enough (i.e., has a ceiling) to avoid capturing accent or cadence voice-characteristics. These voice-characteristics are picked up over longer time intervals.

Some prior art text-to-speech conversion systems include accent. For example, an American accent might pronounce the word "zebra" as ['ziːbrə] ("zeebrah") and a British accent might pronounce the word as ['zɛbrə] ("zebrah"). Both American and British speakers use both the i: and ɛ phones in different words, but text-to-speech uses one phone or the other in the specific word "zebra" based on the accent. Thus, text-to-speech does not allow for full control of the target timbre, but instead is limited by the way the target pronounces specific words. Accordingly, by maintaining a sufficiently short receptive field 114, the analytical audio segments 124 largely avoid gathering data that includes these other characteristics picked up over longer time intervals (e.g., in the complete word "zebra").

Indeed, the prior art known to the inventors has problems capturing pure timbre because the receptive fields are too long, e.g., the receptive fields cause the voice mapping to inherently include additional characteristics when trying to map timbre (e.g., accent). The problem with mapping accent is that a speaker can change accent while maintaining the speaker's timbre. Thus, such prior art is unable to obtain the true timbre of the voice separate from these other characteristics. For example, prior art text-to-speech conversion, such as those described in Arik et al. (Sercan O. Arik, Jitong Chen, Kainan Peng, Wei Ping, and Yanqi Zhou: *Neural Voice Cloning with a Few Samples.*, arXiv:1708.07524, 2018), synthesize the entire voice based on the converted word. Because the conversion is text-to-speech, rather than speech-to-speech, the system needs to make decisions not only about timbre, but also about cadence, inflection, accent, etc. Most text-to-speech systems do not determine each of these characteristics in isolation, but instead learn, for each person they are trained on, the combination of all of these elements for that person. This means that there is no adjustment of the voice for timbre in isolation.

In contrast, illustrative embodiments transform speech, rather than synthesize it, using speech-to-speech conversion (also referred to as voice-to-voice conversion). The system 100 does not have to make choices about all of the other characteristics like cadence, accent, etc. because these characteristics are provided by the input speech. Thus, the input speech (e.g., speech segment 103) is specifically transformed into a different timbre, while maintaining the other speech characteristics.

Returning to FIG. 3, the process proceeds to step 306, which extracts frequency distributions from the analytical audio segments 124. The frequency distribution of any particular analytical audio segment 124 is different for every voice. This is why different speakers' timbres are distinguishable. To extract the frequency information from a particular analytical audio segment 124, the transformation engine 118 may perform a Short-Time Fourier Transform (STFT). It should be understood, however, that the STFT is merely one way of obtaining frequency data. In illustrative embodiments, the transformation engine 118 may be part of the machine learning and build its own set of filters that produce frequency data as well. The speech sample 105 is broken up into (potentially overlapping) analytical audio segments 124, and the transformation engine performs FFT on each analytical audio segment 124. In some embodiments, the transforming engine 118 includes a windowing function over the analytical audio segment 124 to relieve problems with boundary conditions. Even if there is some overlap between the analytical audio segments 124, they are still considered to be different audio segments 124. After the extraction is complete, the analytical audio segments 124 frequency data is obtained. The result is a set of frequency strengths at various points in time, which in illustrative embodiments are arranged as an image with frequency on the vertical axis and time on the horizontal axis (a spectrogram).

Figure 5A:
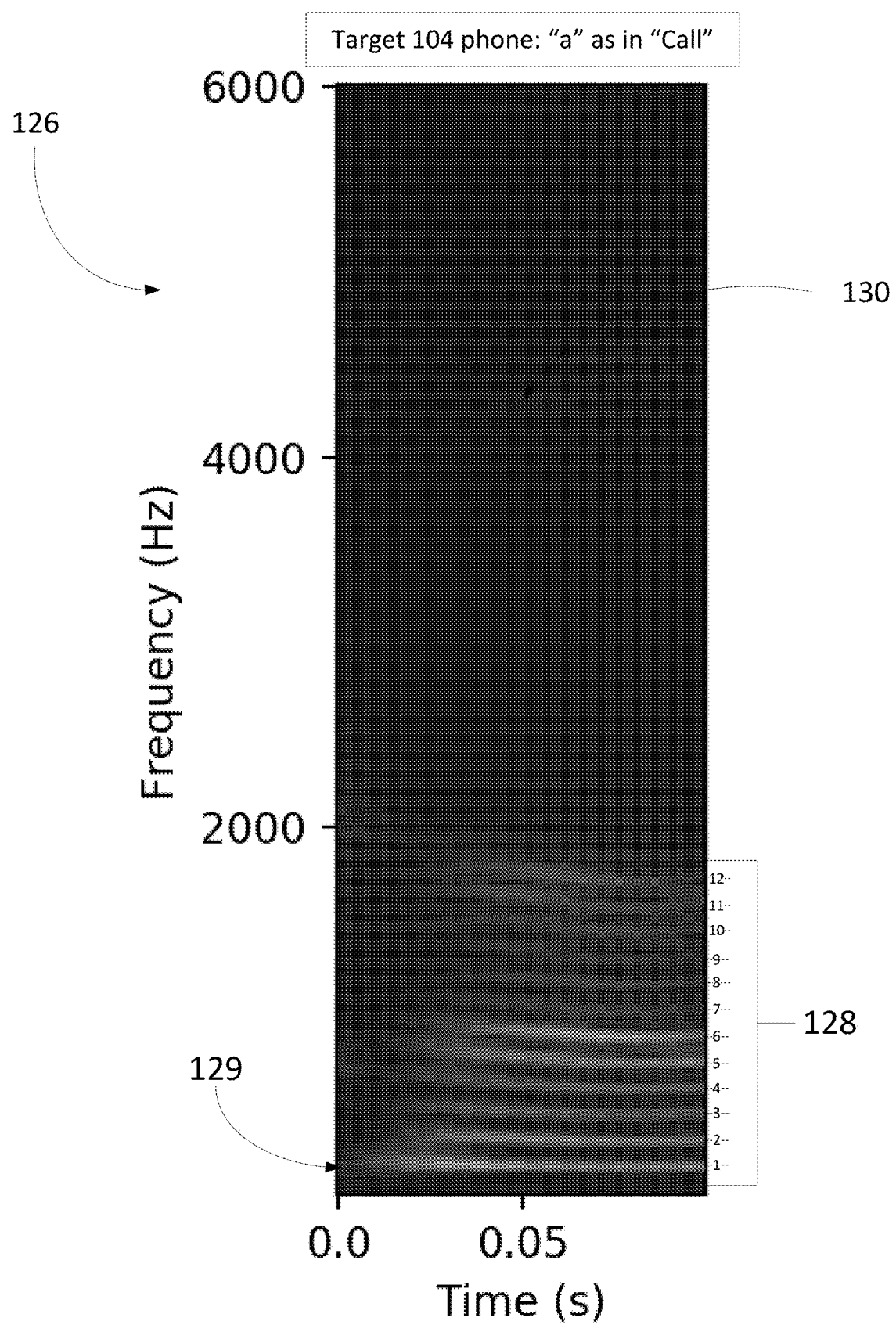
FIGS. 5A-5C show spectrograms having extracted frequency distributions of different analytical audio segments from the same speech segment of FIG. 4 in accordance with illustrative embodiments of the invention.
Figure 5B:
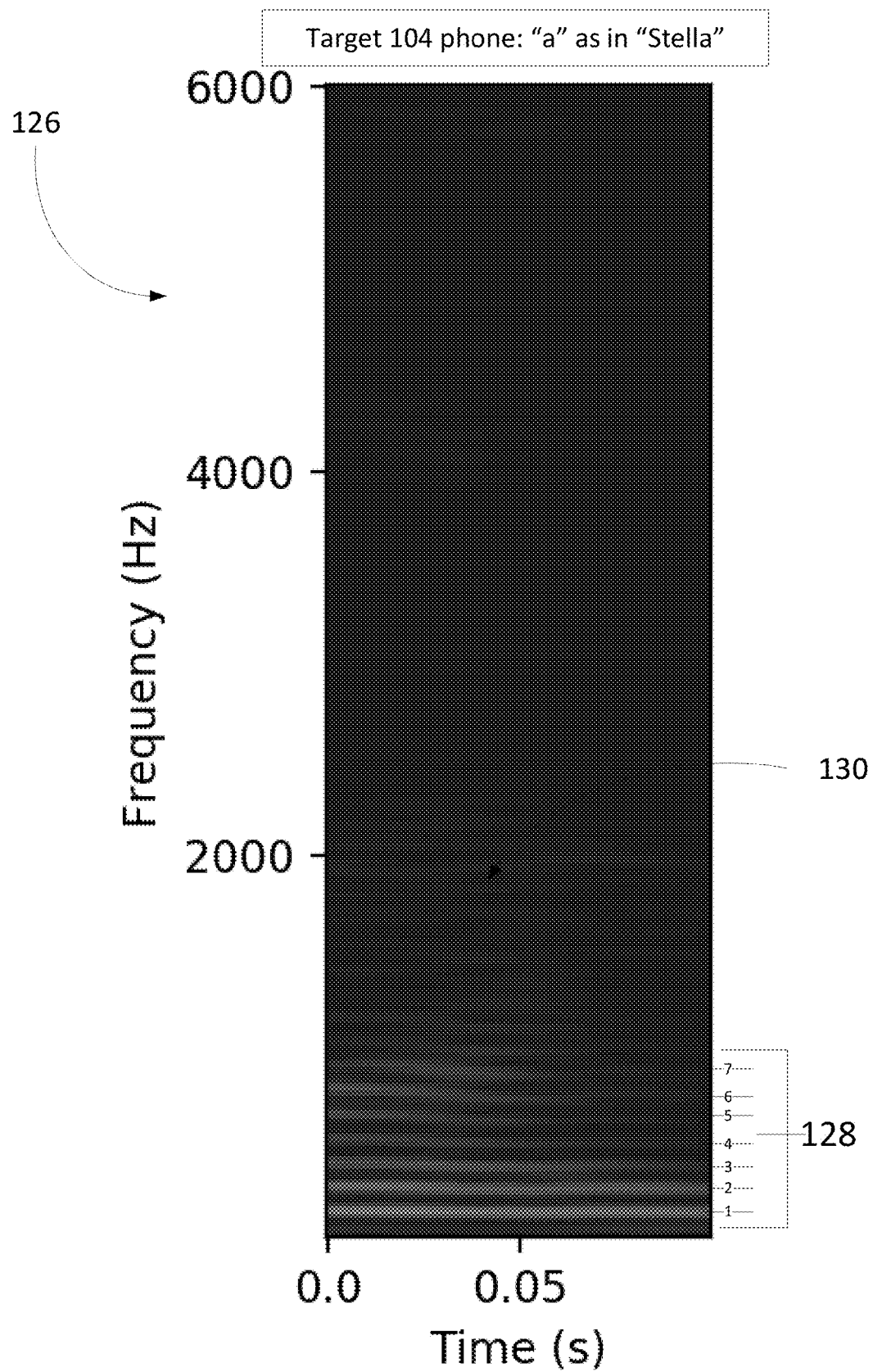
Figure 5C:
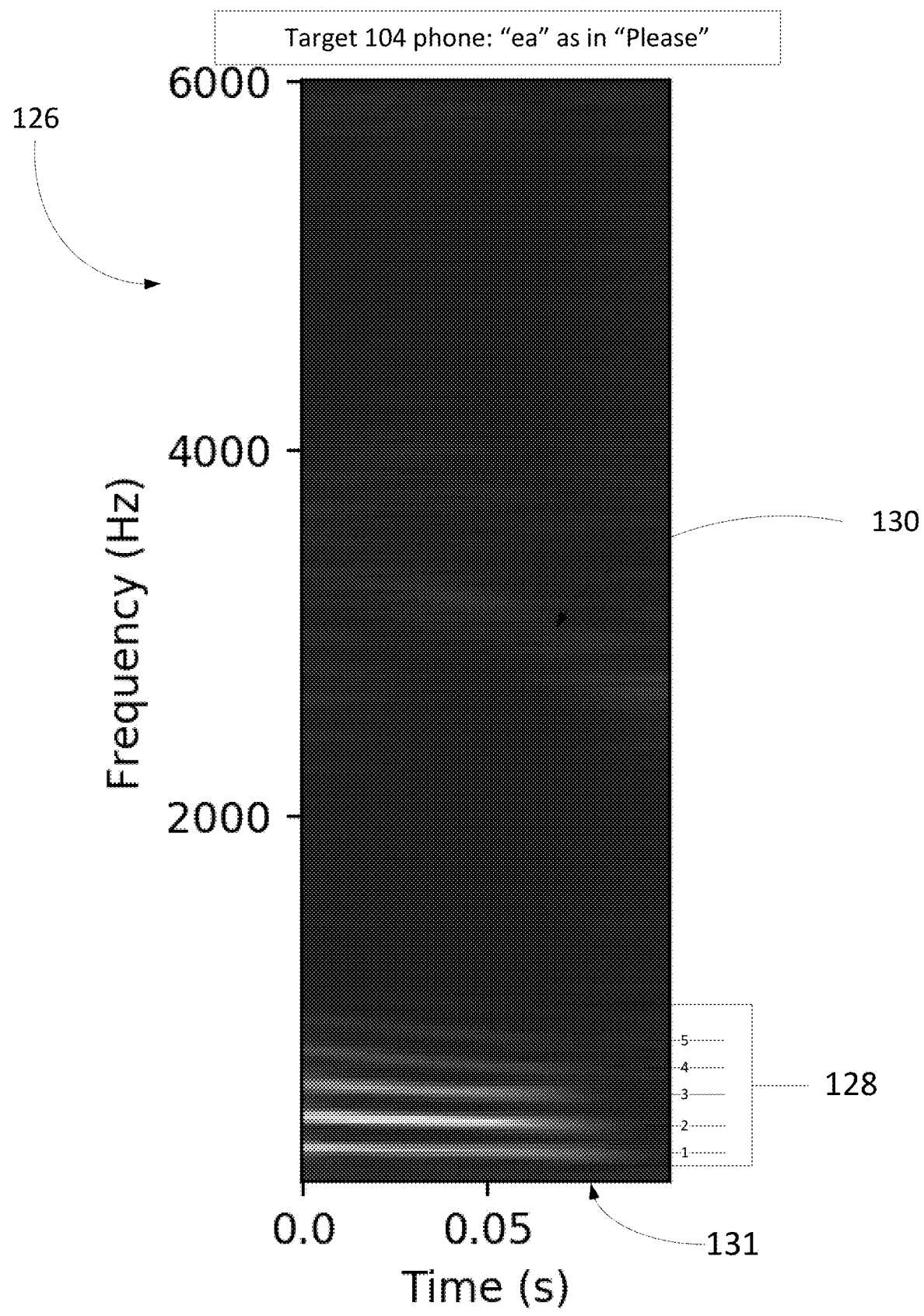

FIGS. 5A-5C show spectrograms 126 having the extracted frequency distributions of different analytical audio segments 124 from the same speech sample 105 of FIG. 4 in accordance with illustrative embodiments of the invention. The term "frequency distributions" refers to the set of individual frequencies, and their individual intensities, present in a particular analytical audio segment 124 or collection thereof, depending on the context. FIG. 5A shows the spectrogram 126 for the "a" phone in the word "Call" made by the target 104. As known to those in the art, the spectrogram 126 plots time against frequency, and also shows the amplitude/intensity (e.g., in dB) of the frequency via color intensity. In FIG. 5A, the spectrogram 126 has twelve clearly visible peaks 128 (also referred to as formants 128), and each peak has a color intensity associated with the more audible that frequency is.

The system 100 knows that the spectrogram of FIG. 5A represents the "a" sound. For example, the correlation engine 122 may analyze the frequency distribution for the analytical audio segments 124 and determines that this frequency distribution represents the "a" phone in the word "Call." The system 100 uses the frequency components of the analytical audio segment 124 to determine the phone. For example, the "a" sound in "Call" has medium-frequency components (near 2 kHz) regardless of who is speaking, while those frequency components may not exist for other vowel sounds. The system 100 uses the distinctions in frequency components to guess the sound. Furthermore, the system 100 knows that this frequency distribution and intensity is specific to the target 104. If the target 104 repeats the same "a" phone, a very similar, if not identical, frequency distribution is present.

If the feature extractor 120 is unable to determine that the analytical audio segment 124 correlates to any particular sound known to it, then it may send an adjustment message to the temporal receptive filter 114. Specifically, the adjustment message may cause the temporal receptive filter 114 to adjust the filter time for the respective, or all, of the analytical audio segments 124. Thus, if the analytical audio segment 124 is too short to capture enough meaningful information about a particular phone, the temporal receptive filter may adjust the length and/or bounds of the analytical audio segment 124 to better capture the phone. Thus, even in illustrative embodiments that do not have a sound identification step, estimates of uncertainty may be produced and used to adjust the receptive field. Alternatively, there could be multiple machine learning systems 116 (e.g., sub-components of the voice feature extractor 120) using different receptive fields all operating at once, and the rest of the system could choose or consolidate between results from each of them.

The feature extractor 120 is not required to look at the frequency distribution in the entire receptive field 114. For example, the feature extractor 120 may look at less than the receptive field 114 provided. Furthermore, the size and the stride of the temporal receptive field 114 may be adjusted by the machine learning.

FIG. 5B shows the spectrogram 126 for the "a" phone in the spoken word "Stella," made by the target 104. This spectrogram 126 has seven clearly visible peaks 128. Of course, there are a number of other peaks 128 that also have frequency data, but they do not have as much intensity as the clearly visible peaks 128. These less visible peaks represent harmonics 130 in the sound made by the target voice 104. While these harmonics 130 are not clearly perceptible in the spectrogram 126 to a human, the system 100 is aware of the underlying data and uses it to help create the voice profile for the target voice 104.

FIG. 5C shows the spectrogram 126 for the "ea" phone in the spoken word "Please," made by the target 104. The spectrogram 126 has five clearly visible peaks 128. In a manner similar to FIGS. 5A and 5B, this spectrogram 126 also has the harmonic frequencies 130. By accessing the frequency data (e.g., in the spectrograms 126), the system 100 determines the sound that is associated with the particular spectrogram 126. Furthermore, this process is repeated for the various analytical audio segments 124 in the speech sample 105.

Returning to FIG. 3, the process proceeds to step 308, which maps a partial voice profile in the vector space 112 for the target voice 104. A partial voice profile includes data relating to the frequency distributions of the various phones in the speech sample 105. For example, a partial voice profile may be created on the basis of the three phones shown for the target 104 in FIGS. 5A-5C. A person of skill in the art should understand that is a substantially simplified example of the partial voice profile. Generally, the speech sample 105 contains more than three analytical audio segments 124, but may contain less. The system 100 takes the frequency data obtained for the various analytical audio segments 124 and maps them in the vector space 112.

The vector space 112 refers to a collection of objects, called vectors, in a database, on which a certain set of operations are well defined. These operations include the addition of vectors, obeying mathematical properties such as associativity, commutativity, identity, and inverse under that operation; and multiplication by a separate class of objects, called scalars, respecting mathematical properties of compatibility, identity, and distributivity under that operation. A vector in the vector space 112 typically is represented as an ordered list of N numbers, where N is known as the dimension of the vector space. When this representation is used, scalars are typically just a single number. In the 3-dimensional vector space of real numbers, [1, −1, 3.7] is an example vector, and 2*[1, −1, 3.7]=[2, −2, 7.4] is an example of multiplication by a scalar.

Illustrative embodiments of the vector space 112 use numbers as shown above, though typically in higher-dimensional use cases. Specifically, in illustrative embodiments, the timbre vector space 112 refers to a mapping which represents elements of timbre—such as richness or sharpness—such that by adding or subtracting the corresponding elements of the vectors, that some part of the actual timbre is changed. Thus, the characteristics of the target voice 104 are represented by the numbers in the vector space, such that operations in the vector space correspond to operations on target voice 104. For example, in illustrative embodiments, a vector in the vector space 112 may include two elements: [the amplitude of the 10 Hz frequency, the amplitude of the 20 Hz frequency]. In practice, the vectors may include a larger number of elements (e.g., an element in the vector for every audible frequency component) and/or be finer-grained (e.g., 1 Hz, 1.5 Hz, 2.0 Hz, etc.).

In illustrative embodiments, moving from a high pitch voice to a low pitch voice in the vector space 112 would require modifying all of the frequency elements. For example, this might be done by clustering several high pitch voices together, several low pitch voices together, and then traveling along the direction defined by the line through the cluster centers. Take a few examples of high pitch voices, and a few examples of low pitch voices, and that gives you the "pitch" access of the space 112. Each voice may be represented by a single vector which may be in multiple dimensions (e.g., 32 dimensions). One dimension may be the pitch of the fundamental frequency, which approximately relates to and distinguishes male from female voices.

The database of voices 111 holds vectors that are encoded in the vector space 112, corresponding to various voices. These vectors may be encoded as lists of numbers, which have meaning in the context of the vector space 112. For example, the first component of the list of numbers might be −2, which in the context of the vector space could mean "high pitch voice", or might be 2, which in the context of the vector space could mean "low pitch voice". The parameters of the machine learning system 116 determine how those numbers are processed, such that the generator 140 might convert an input speech into a high pitch voice based on seeing a −2 in the first component of the list, or that the voice feature extractor might encode a low pitch voice as a vector with a 2 in the second component of the list of numbers stored in the database 111.

In illustrative embodiments, the vector space 112 typically exhibits the kinds of properties described above. For example the average of a deep voice and a high-pitched voice should be a voice that is roughly mid-range; and a gravelly voice moved slightly in the direction of a clear voice (e.g. subtract the gravelly voice from the clear voice to get a vector pointing from "gravelly" to "clear", multiply that by a small scalar so that the vector only changes a little bit, and then add it to the gravelly voice) should sound slightly clearer.

Performing mathematical operations (e.g., averaging voices) on the spectrogram produces sound that does not sound natural (e.g., averaging two voices sounds like two people talking at once). Thus, averaging a deep voice and a high-pitched voice using the spectrogram does not yield a medium-pitched voice. In contrast, the vector space 112 allows the system 100 to perform mathematical operations on the voice, such as "averaging" a high-pitched voice and a low-pitched voice to produce a medium-pitched voice.

FIGS. 6A-6D schematically show the vector space 112 in accordance with illustrative embodiments of the invention. The process 300 proceeds to decision 310, which determines whether this is the first voice mapped in the vector space. If this is the first voice mapped, then its relative location in the vector space 112 is not consequential. The system 100 can map the voice 104 in the vector space 112 at any location because there is no relative scale to which to compare the voice 104.

Figure 6A:
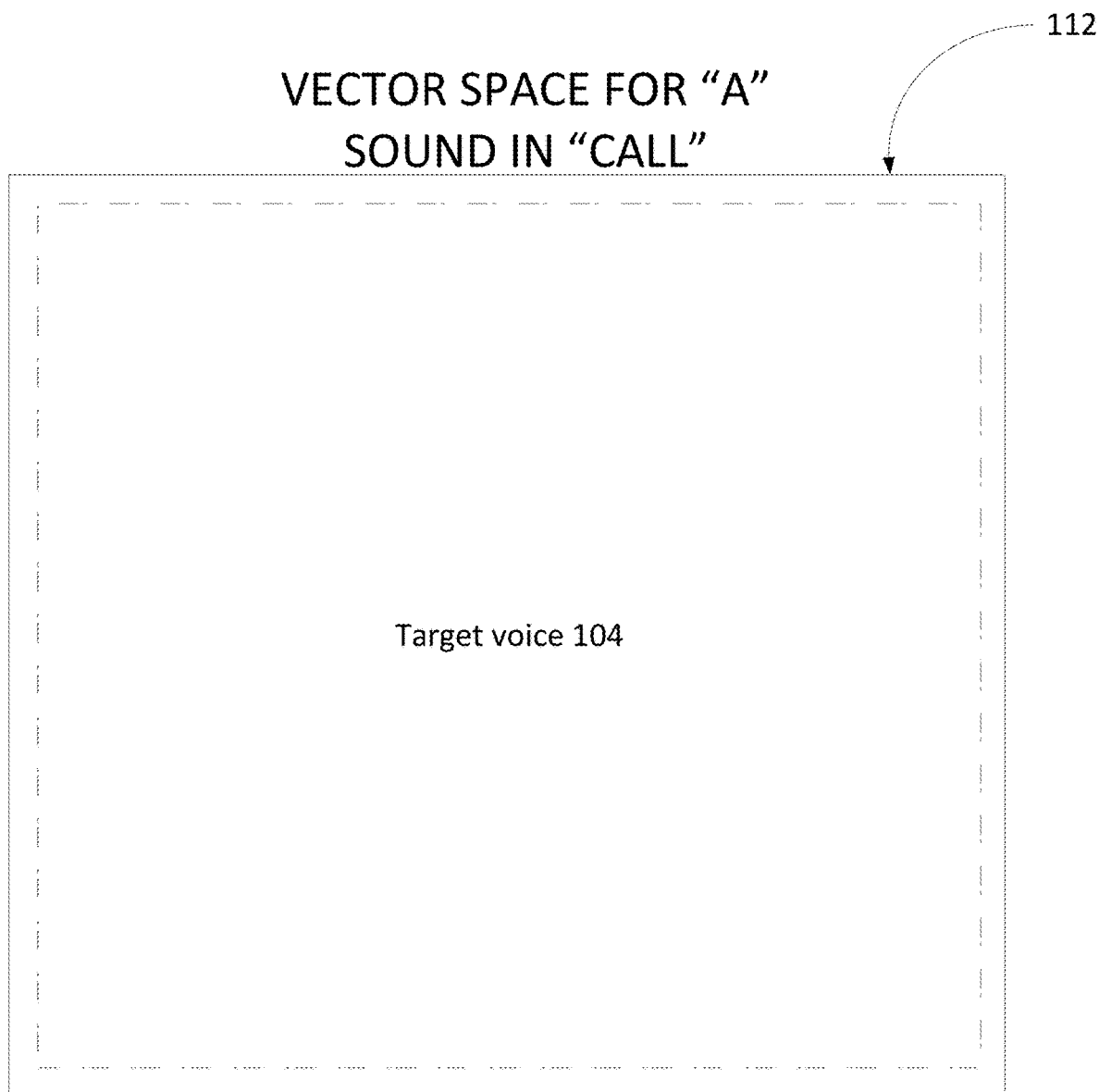
FIGS. 6A-6D schematically show slices of a vector space in accordance with illustrative embodiments of the invention.

FIG. 6A schematically shows the vector space 112 containing only the target voice 104 for the "a" sound as in the word "Stella," as shown in FIG. 5B. Although illustrative embodiments discuss and show figures for the vector space 112 for a particular sound, a person of skill in the art understands that the vector space 112 maps timbre that is independent of any specific sound. Thus, hearing a particular voice speak a new sound helps the vector space 112 place the speaker in the overall vector space 112. Illustrative embodiments show and refer to vector spaces 112 for particular sounds for the purpose of simply illustrating ways by which the machine learning system 116 may map voices.

Because the target voice 104 is the first (and only) voice mapped in the database 112, the entirety of the database 112 reflects information relating only to the target voice 104. Thus, the system 100 considers that all voices are the target voice 104. Because this is the first voice, the process loops back and maps a second voice as described earlier.

Figure 7A:
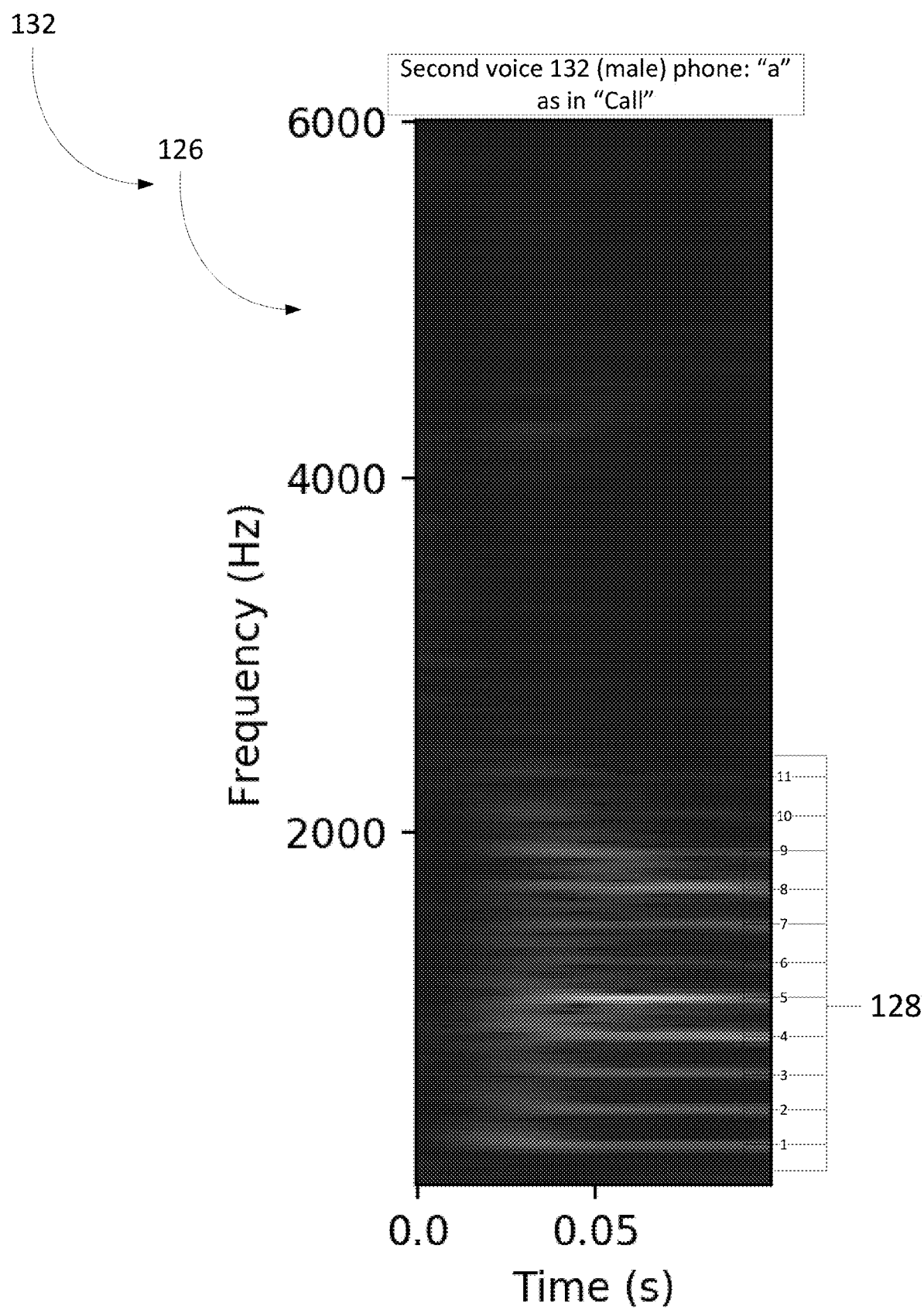
FIG. 7A shows the spectrogram for the "a" phone in the word "Call" in the timbre of the second voice.

FIG. 7A schematically shows the spectrogram 126 for the "a" sound in the word "Call" made by a second (male) voice 132. This is the same phone as the phone enunciated by the target 104 in FIG. 5A. However, the second male voice 132 has only eleven visible peaks 128. Additionally, the visible peaks 128 for the second male voice 132 go beyond the 2 kHz frequency, whereas the visible peaks 128 for the target 104 were less than 2 kHz frequency. Despite the difference in frequency distributions (e.g., as displayed by the spectrograms 126), in illustrative embodiments, the correlation engine 122 may determine that the frequency distribution represents the "a" phone in "call," and maps it in the vector space 112 accordingly. In illustrative embodiments, after the system 100 determines that there is data for another speaker for the same phone (e.g., the "a" phone as in the word "Call,"), the system 100 maps the speakers relative to one another in the vector space 112, e.g., using the processes described previously.

Figure 6B:
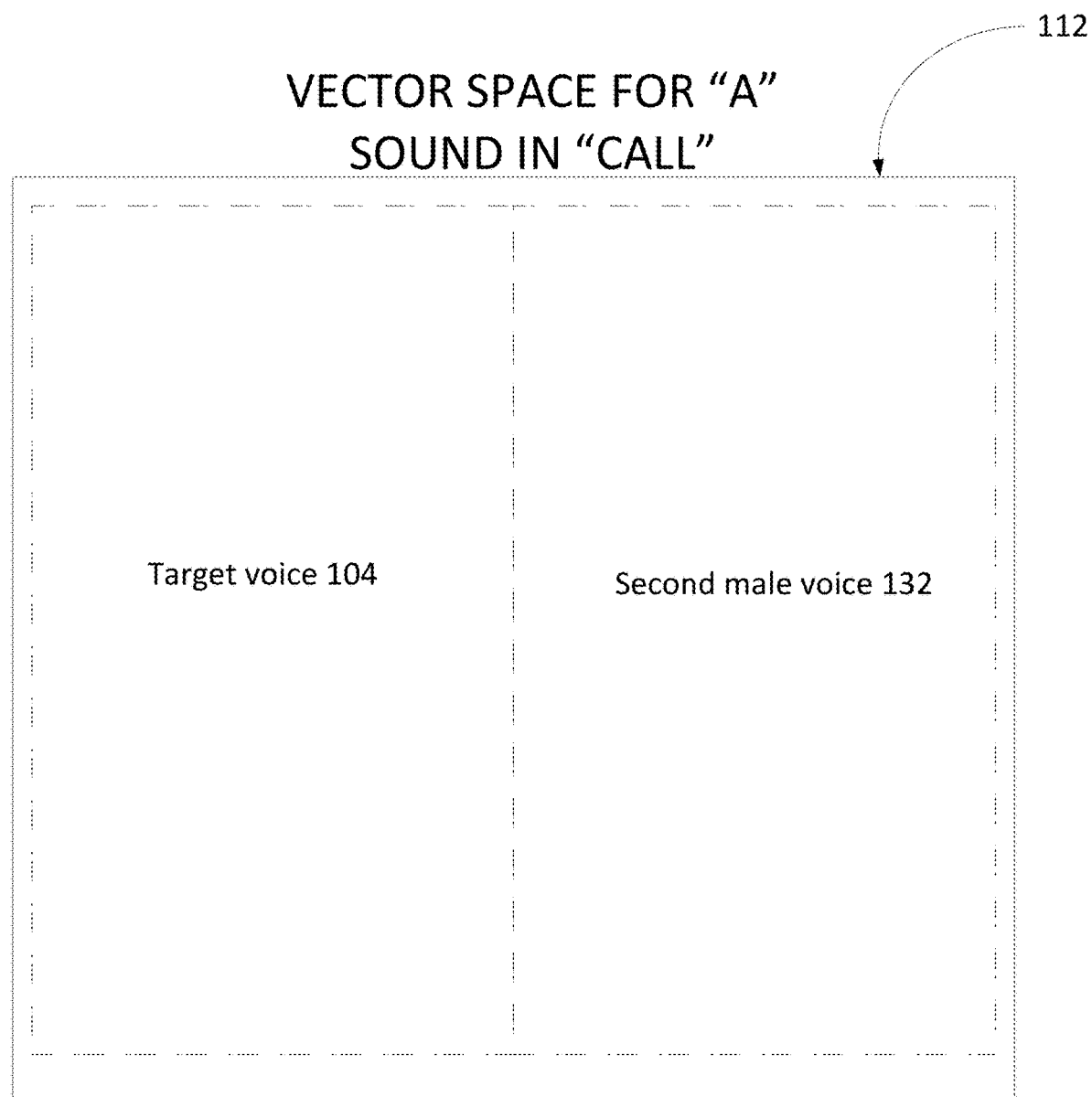

FIG. 6B schematically shows the vector space 112 for the phone: "a" sound as in the word "Stella," mapping the target voice 104 and the second male voice 132. The system 100 compares the data relating to the phone spoken by the target voice 104 and the second voice 132. The frequency distribution characteristics allow the system 100 to plot the voices relative to one another. Thus, if the system 100 receives an entirely new input of the "a" sound, it can distinguish between the target voice 104 and the second voice 132 based on which voice has the most similar frequency characteristics to the input.

Although FIG. 6B shows the voices 104 and 132 mapped as totally separate segments, it should be understood that the boundaries are not so definite. In fact, these boundaries represent probabilities that the particular voice is representative of a particular frequency distribution. Thus, in practice, one voice may produce a sound that overlaps into the other voice's drawn territory (e.g., overlapping frequency characteristics). However, the voice borders are intended to show that the sounds with particular frequency distributions have the greatest probability of being from a particular speaker.

Figure 6C:
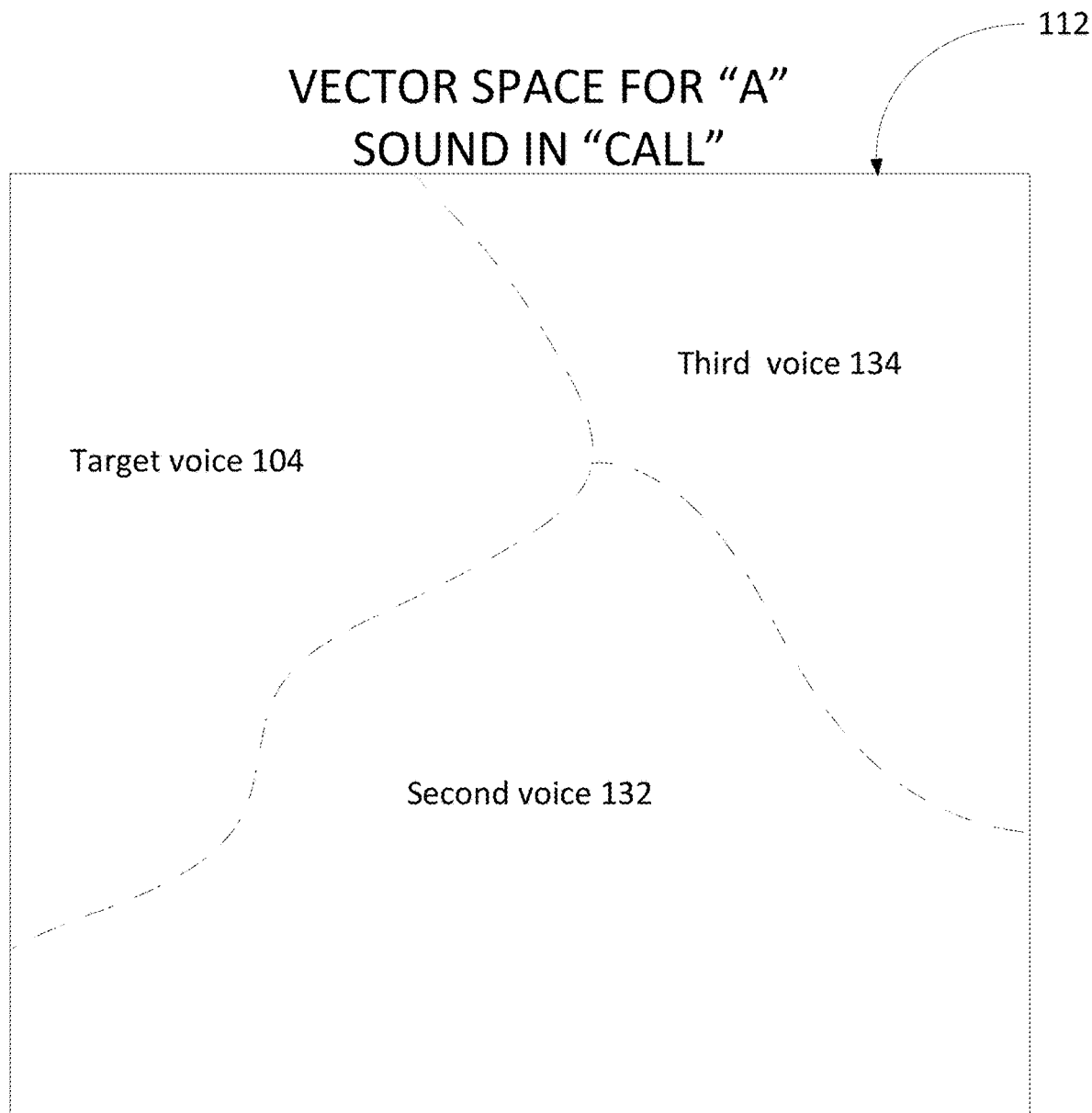
Figure 7B:
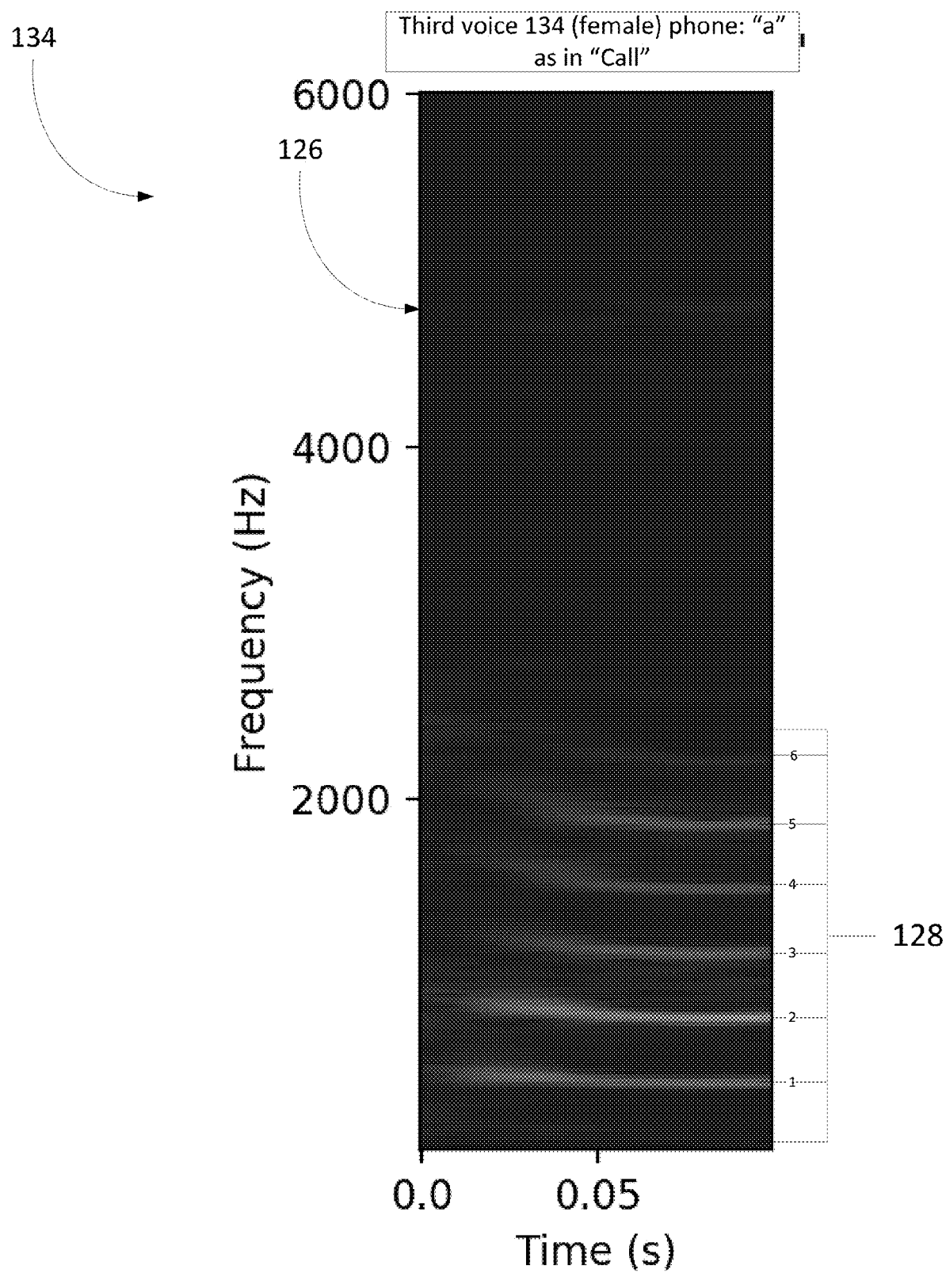
FIG. 7B shows the spectrogram for the "a" phone in the word "Call" in the timbre of the third voice.

Step 310 in the process also determines whether there are more voices to map. If there are more voices to map, steps 302-310 are repeated. FIG. 7B schematically shows the spectrogram 126 for the "a" phone in the word "Call" made by a third voice (female) 134. This third voice 134 has six visible peaks 128. The peaks 128 for the third voice 134 are not as condensed as in the target voice 104 and the second voice 132. Again, despite the difference in frequency distributions (e.g., as displayed by the spectrograms 126), the correlation engine 122 may determine that the frequency distribution represents the "a" phone in "call" with a high probability. The system 100 maps this additional voice in the vector space 112. Furthermore, the system 100 now learns to distinguish the "a" sound in the word "call" between three speakers, as shown in FIG. 6C. In some embodiments, the voice feature extractor 120 and generator 140 are trained end-to-end via backpropagation adversarially against the discriminator 142.

Figure 6D:
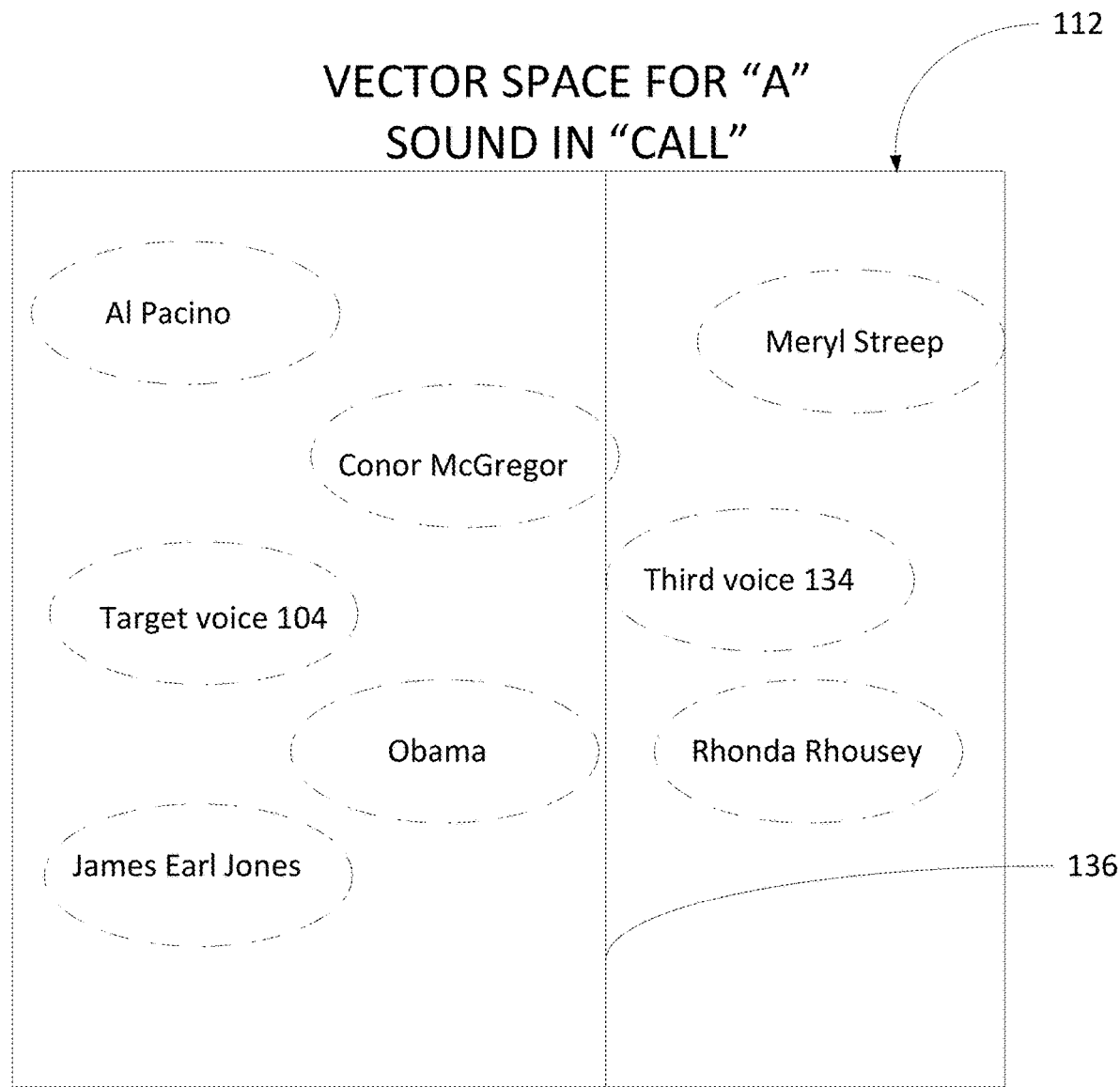

FIG. 6D shows the vector space 112 after several cycles of the process 300 using various examples. After a plurality of voices have been mapped in the vector space 112, the system 100 more accurately distinguishes voices. The frequency characteristics attributable to a particular speaker become more specific as the vector space 112 has more timbre data to compare. While the voices are shown as broken line circles, it should be understood that the circle represents a complex set of frequencies, as shown in the spectrograms 126, and also variations thereof (which may be described as a timbre "tolerance," e.g., a variety of slightly varied frequency distributions may sound as if they come from the same voice).

Furthermore, the vector space 112 begins to form associations with certain timbres. For example, a characteristic line 136 begins to develop, distinguishing male voices from female voices. While the characteristic line 136 is not shown as distinguishing perfectly between voices, it is expected to be fairly accurate. Characterizing timbres by characteristics (e.g., gender, ethnicity, age, etc.) is possible because the timbre, or the collection of frequency distributions, of a particular voice is caused largely by physiological factors. The sounds made by a particular speaker are filtered by the supralaryngeal vocal tract, whose shape determines the timbre of the sound. The size (e.g., thickness, width, and length) of the vocal cords cause certain vibrations, which result in different frequencies, and thus, different timbres. For example, women are genetically predisposed to having higher formant frequencies than men, and larger gaps between peaks 128. Accordingly, physiologically similar populations (e.g., men vs. women, Caucasian v. African American, etc.) have more similar frequency distributions with respect to particular phones.

At step 312 the process also extrapolates a synthetic voice profile for the target voice 104. The synthetic voice profile is the set of frequency distributions predicted by the machine learning system 116 for phones where authentic frequency distribution data does not exist. For example, as shown in FIGS. 5A-5C, the system 100 may have actual data relating to the phones in the phrase "CALL STELLA PLEASE." However, the system 100 has no authentic data relating to the "D" phone in Dog from the target voice 104.

Figure 8A:
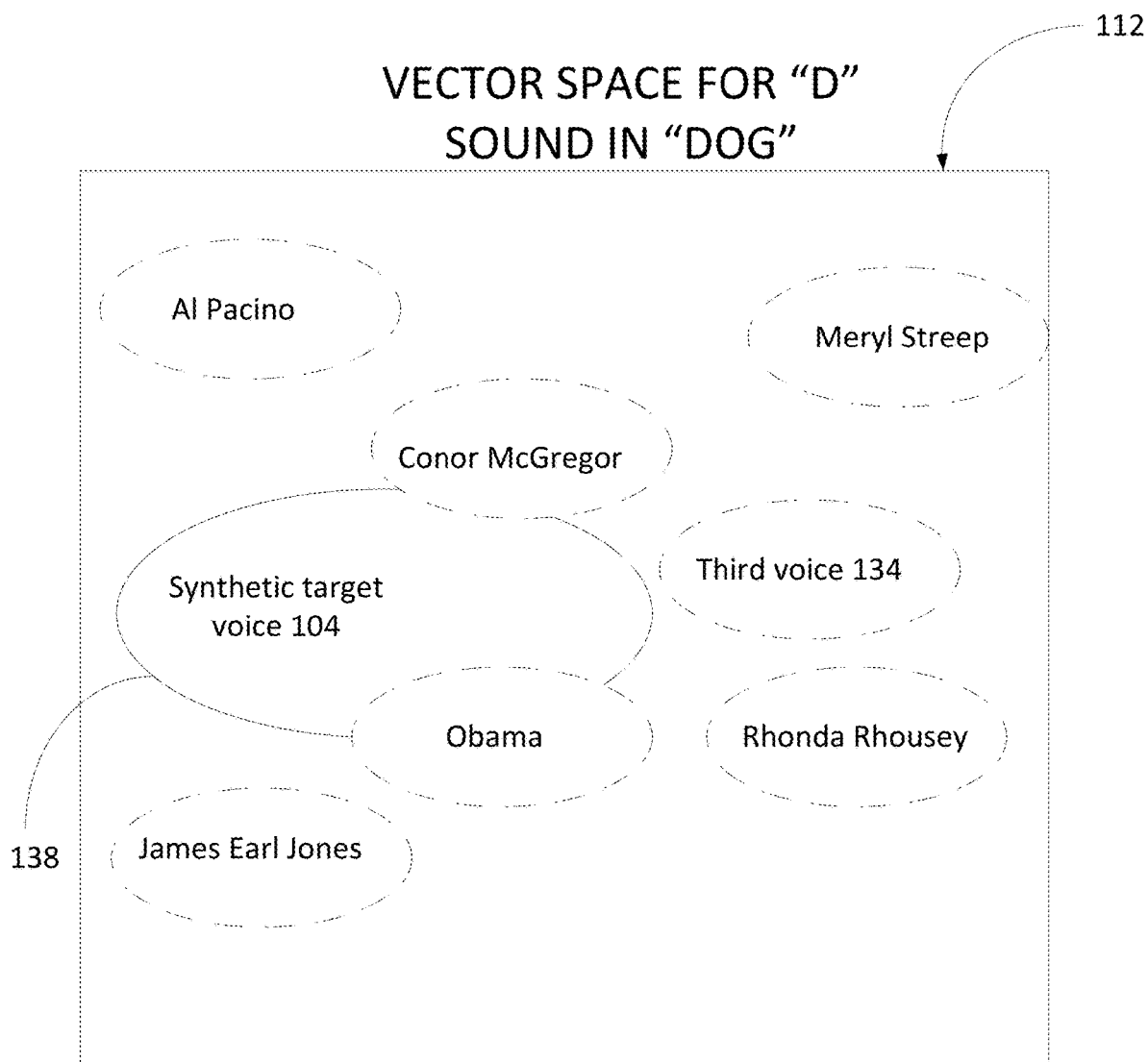
FIG. 8A schematically shows a slice of the vector space including a synthetic voice profile in accordance with illustrative embodiments of the invention.

FIG. 8A schematically shows the vector space 112 including the synthetic voice profile 138 in accordance with illustrative embodiments of the invention. The vector space 112 shown is for the "D" phone in "DOG." FIG. 8 shows mapped authentic data about a plurality of voices having made the "D" phone. As described in FIG. 6D, the target voice 104 has been mapped against these voices for a different phone: "A" as in "CALL." Because changes in frequency distributions for various phones are generally predictable, the machine learning system 116 makes predictions about the frequency distribution of phones where no authentic data exists. For example, the machine learning maps the synthetic voice profile 138 of the target voice 104 for the "D" phone, relative to the other voices.

To create the synthetic voice profile 138, the partial profile for the target voice 104 is compared to other stored voice profiles, and the synthetic voice profile 138 for the target voice 104 is extrapolated as a result of the comparison. Thus, phones that were not previously provided to the system 100 may be extrapolated from the relatively small speech sample 105 from the target voice 104. Details of illustrative embodiments are discussed below.

As an initial matter, it should be understood that the vector space 112 is a complex multi-dimensional structure, and thus, two-dimensional slices of the vector space 112 are shown for particular phones in the figures. However, the various phone vector spaces 112 shown are merely for illustrative purposes, and are part of the larger complex three-dimensional vector space 112. The frequency distributions in the authentic voice profile for the target voice 104 (e.g., the frequency distributions for all of the available phone data from the speech sample 105) are compared to other mapped voice profiles. The synthetic voice profile 138 is extrapolated for missing phones. A person of skill in the art will understand that although adjustments are shown to a slice of the voice profile for a particular phone, in practice, the adjustment is made to the entire multi-dimensional voice profile, which is not easily illustrated. The adjustments may be accomplished by machine learning system 116, such as a neural network 116.

The machine learning system 116 preferably is a specialized class of problem solver that uses an automated feedback loop to optimize itself and improve its ability to solve the problem at hand. The machine learning system 116 takes inputs from the actual problem it is trying to solve, but also has various parameters, or settings, which are entirely internal to itself. The machine learning system 116, as opposed to a data science system, may be configured to automatically attempt to solve its given problem for various inputs, and (sometimes, though not always, with the aid of automated feedback on its answers) update its parameters such that future attempts produce better results. This update occurs according to a specific, mathematically well-defined procedure that is chosen prior to the beginning of training of the machine learning system 116.

Although described simply with reference to the figures, extrapolating the synthetic voice 138 is not as simple as comparing the frequency distributions of two phones. The partial voice profile of the target voice 104 contains data relating to a plurality of different analytical audio segments 124, and thus phones. While the fluctuations in frequency distribution for different phones have general trends, there is no universal mathematical formula/conversion ratio between phones. For example, just because Voice A falls directly in the middle of Voice B and Voice C for phone "a," does not mean that Voice A falls directly in the middle of Voice B and Voice C for phone "d." The difficulty with predicting voice distributions is compounded by the fact that these are complex signals (i.e., a range of frequencies each with a respective intensity). Furthermore, there are a large number of different frequency distributions that may provide a similar sounding timbre to a particular phone. Thus, the machine learning system 116 is tasked with providing a range of frequency distributions for a particular phone. The more voices the system 100 has mapped, generally, the better the synthetic voice profile 138 matches the timbre of the target voice 104.

To help position the target voice 104 in the vector space 112, the generator 140 and the discriminator 142 may execute a feedback loop described below with reference to FIG. 9. In some embodiments, the target voice 104 may be positioned in the vector space without using the feedback loop if the voice feature extractor 120 has been trained on many voices previously (i.e., mapped many voices previously using the feedback loop). However, other embodiments may still use the feedback loop even if the voice feature extractor 120 has been trained on many voices.

Figure 8B:
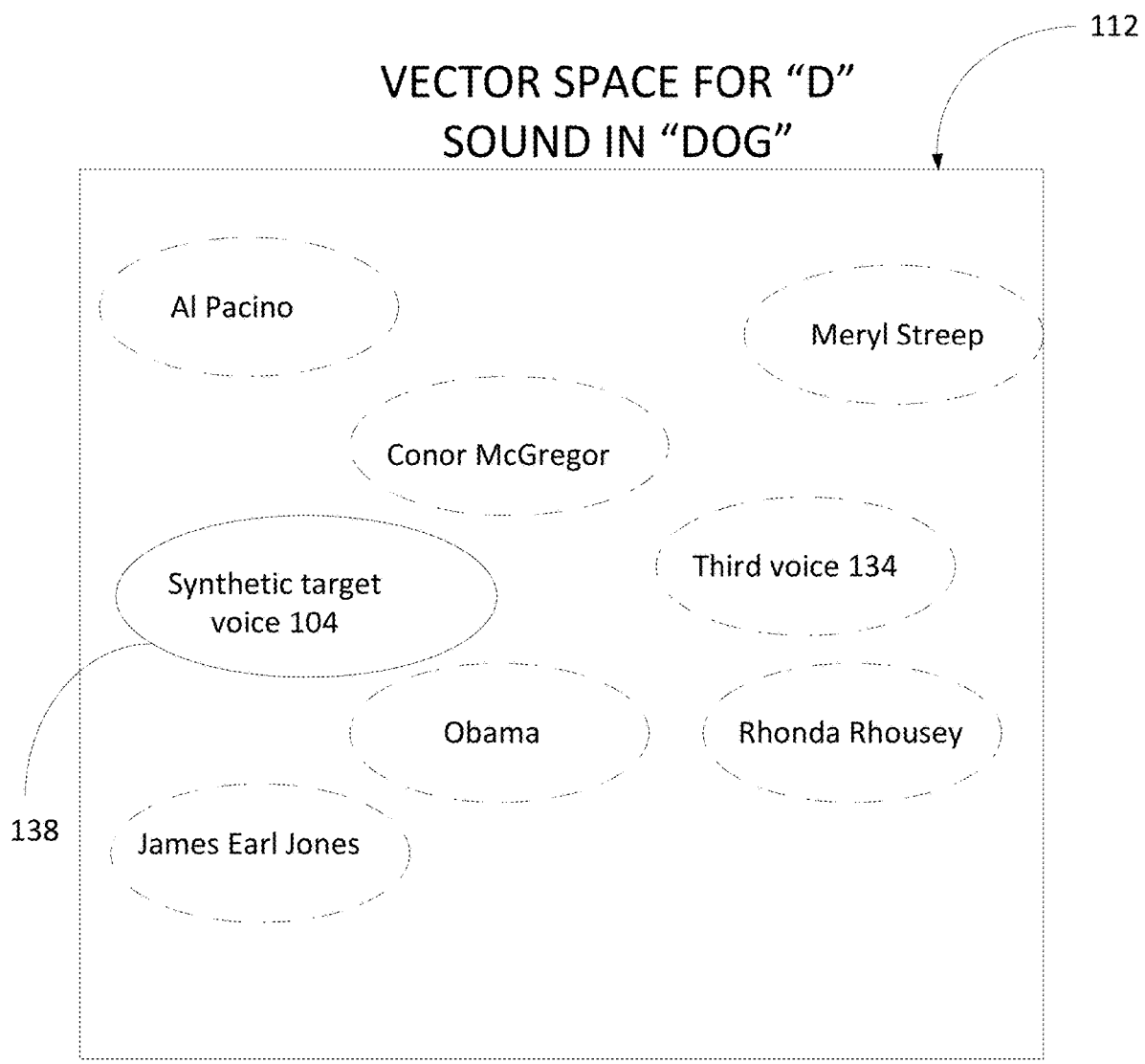
FIG. 8B schematically shows the slice of the vector space that corresponds to the phone "D" in "DOG," after the generative adversarial neural network refines the synthetic voice profile in accordance with illustrative embodiments of the invention.

At step 314 the process also refines the synthetic voice profile 138. FIG. 8B schematically shows the vector space 112 for the phone "D" in "DOG," after the synthetic voice profile 138 is refined using a generative adversarial neural network 116, in accordance with illustrative embodiments of the invention. The generative adversarial neural network 116 includes a generative neural network 140 and a discriminative neural network 142.

The generative neural network 140 is a type of machine learning system 116 system whose "problem" is to create realistic examples belonging to a predefined class. For instance, a generative neural network used for faces would be attempting to generate images of faces that appear realistic. In illustrative embodiments, the generative neural network 140 generates realistic examples of the speech of the target timbre 104.

The discriminative neural network 142 is a type of machine learning system 116 system whose "problem" is to identify the category to which its input belongs. For example, the discriminative neural network 142 may identify whether it has been given pictures of a dog or a wolf in image settings. In illustrative embodiments, the discriminative neural network 142 identifies whether the inputted speech is from the target 104 or not. Alternatively, or additionally, the discriminative neural network 142 identifies the speaker of the inputted speech.

Figure 9:
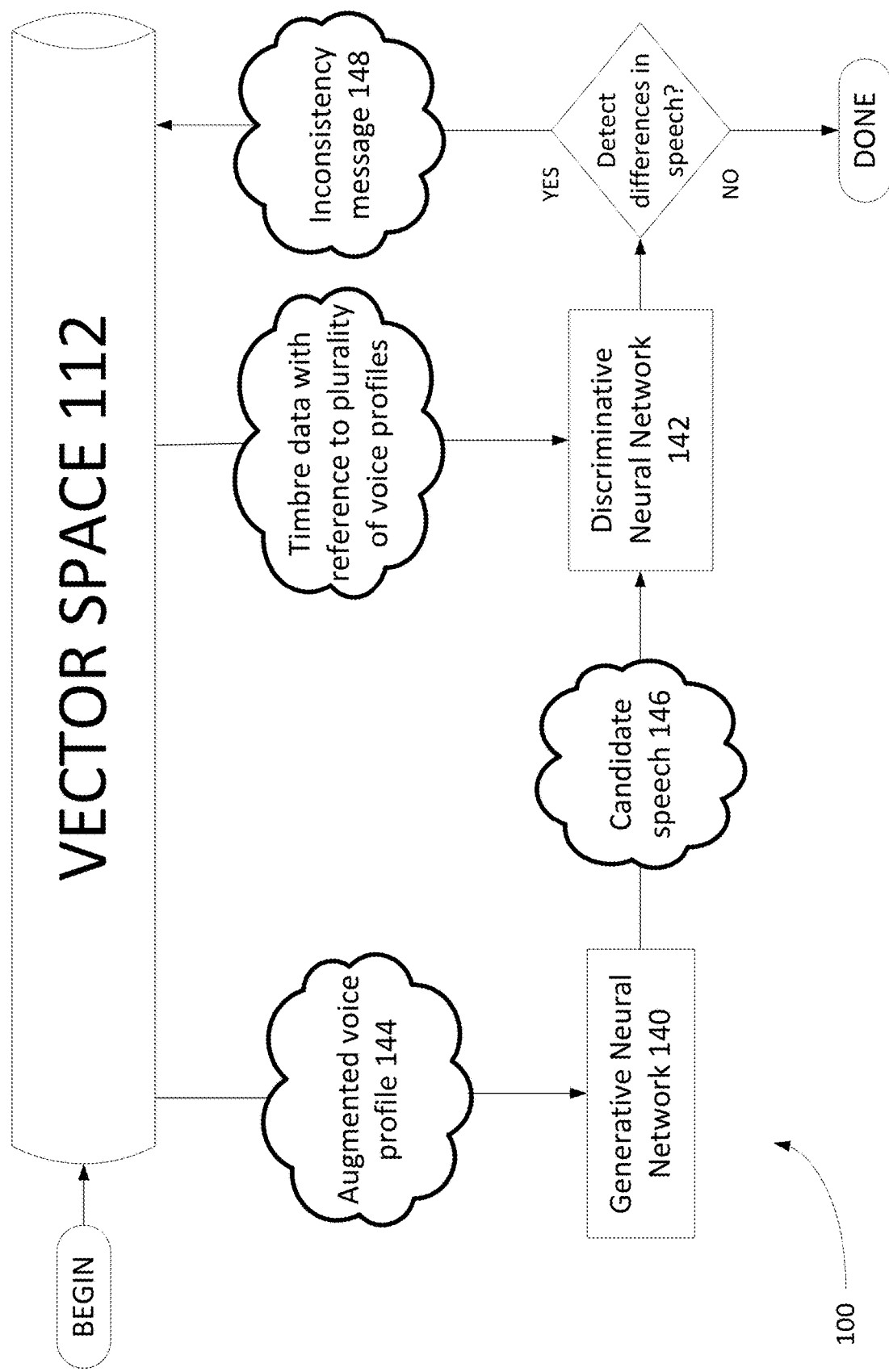
FIG. 9 shows a block diagram of the system using the generative adversarial network to refine an augmented voice profile in accordance with illustrative embodiments of the invention.

FIG. 9 shows a block diagram of the system 100 using the generative adversarial network 116 to refine an augmented voice profile 144 in accordance with illustrative embodiments of the invention. The augmented voice profile 144 is the combination of the (authentic) voice profile obtained from the speech sample 105, in addition to the synthetic voice profile 138 created by the machine learning system 116. The vector space 112 provides the augmented voice profile 144 to the generative neural network 140. The generative neural network 140 uses the augmented voice profile 144 to generate speech data that represents a candidate speech segment 146 (i.e., speech that is supposed to imitate the target 104, but that is not authentic speech from the target 104). The generated candidate speech segment 146 can be said to be in a candidate voice. The speech data that represents the candidate speech segment 146 is evaluated by the discriminative neural network 142, which determines whether it believes the speech data that represents the candidate voice in the candidate speech segment 146 is authentic or synthetic speech.

If the system 100 produces an audio candidate speech segment 146, it inherently contains speech data that represents the candidate speech segment 146. However, the generator 140 can provide data that represents the candidate speech segment 146 that is never actually output as an audio file. Thus, the speech data that represents the candidate speech segment 146 may be in the form of audio as a waveform, a spectrogram, vocoder parameters, or other data that encodes the prosody and phone content of the candidate speech segment 146. Furthermore, the speech data may be the output of some intermediate of the neural network 116. This output may not be understood by a normal human observer (e.g., prosody data and phone data do not have to be separated), but the neural network 116 understands the information and encodes it in a way that is understandable by the machine learning 116 or portions thereof. Discussion further below refers to "candidate speech segment 146" for convenience, but should be understood to encompass the broader "speech data that represents the candidate speech segment 146."

In illustrative embodiments, the candidate speech segment 146 is generated on the basis of the source speech segment 103. Although shown in FIG. 1 as being a user (i.e., Arnold), the source voice 102 does not have to be inputted to the system 100 at the time of training. The source voice 102 can be any voice that is inputted into the system 100, already stored in the system 100, or synthesized by the system 100. Thus, the source speech segment 103 may be provided by a user, may be provided by a speech segment from a voice already in the system 100 (e.g., a mapped voice), or may be generated by the system 100. The user converting their speech, the generated voice, and/or the voice with speech already in the system 100 may be considered the source voice 102. Furthermore, as different candidate speech segments 146 are produced during the feedback loop shown in FIG. 9, different source speech segments 103 may be used.

The discriminative neural network 142 receives the candidate speech segment 146, and also data relating to a plurality of voices, including the target voice 104. In illustrative embodiments the generator 140 and the discriminator 142 receive data about a plurality of voice profiles, which include the target voice. This allows the neural network 116 to identify changes that make the speech sound more or less like the target 104 with reference to the plural timbre data of the other voices. However, it should be understood that data relating to the target voice 104 itself may implicitly relate to a plurality of voices, as the characteristics of other voices are already understood in some capacity via the discriminator's 142 learned parameters at the time it maps or refines the target voice 104. Furthermore, as the target voice 104 is refined through training or the addition of more voices to the vector space 112, the target voice 104 further provides data relative to a plurality of voices. Thus, illustrative embodiments may, but do not require, that the generator 140 and/or the discriminator 142 explicitly receive data from a plurality of voice profiles. Instead, the generator 140 and/or the discriminator 142 may receive data from the target voice 104 profile, which has been modified on the basis of a plurality of voice profiles. In either of the previous scenarios, the system 100 can be said to receive data with reference to a plurality of voice profiles.

In illustrative embodiments, the generator 140 is penalized (by the discriminator 142) for generating candidate speech segments 146 that sounds like a voice other than the target 104. In illustrative embodiments, the generator 140, the voice feature extractor 120, and/or the discriminator 142 have access to data relating to a plurality of voice profiles. Accordingly, the generator 140, the discriminator 142, and/or the voice feature extractor 120 may make decisions with reference to a timbre data of a plurality of different voices. Thus, the generator 140 does not make changes to the target voice 104 profile that make the synthetic speech sound like someone other than the target 104, even if that speaker is very similar to the target 104. Because the generator 140 has access to the data relating to the plurality of voice profiles, it can differentiate between the target and other speakers that potentially sound similar, producing better quality candidate speech segments 146. In turn, the discriminator 142 picks up on finer details and provides more detailed inconsistency messages 148. Although not shown in the figure, the inconsistency message 148 may be provided to the voice feature extractor 120, which then modifies the voice profiles in the vector space 112.

As described above, the discriminative neural network 142 (also referred to as "discriminator 142") attempts to identify whether the candidate speech segment 146 is from the target 104 or not. A person of skill in the art understands the different methods that may be used to determine whether the candidate speech segment 146 is from the target voice 104. Specifically, the discriminator 142 determines that certain frequencies and/or frequency distributions are or are not likely part of the timbre of the target voice 104. The discriminator 142 may do this by comparing the candidate speech segment 146 to the target timbre 104 and other voices mapped in the vector space 112 (i.e., with reference to a plural timbre data of a plurality of different voices). Accordingly, the more voices mapped in the vector space 112, the better the discriminator 142 discerns authentic speech from synthetic speech. Thus, in some embodiments, the discriminator 142 may assign an identity to candidate voice and/or the candidate speech segment 146.

In illustrative embodiments, the discriminator 142 has a temporal receptive field 114 that prevents it from "seeing"/discriminating based on things like cadence, accent, etc. Additionally, or alternatively, the generator 140 has a temporal receptive field 114 that prevents it from generating based on things like cadence, accent, etc. Thus, the candidate speech segment 146 may be generated sufficiently short to avoid including longer-temporal characteristics, such as cadence, accent, etc, and/or may be filtered using the temporal receptive field 114. Thus, the discriminator 142 distinguishes authentic from fake speech on the basis of timbre, rather than by discriminating based on these other characteristics.

The discriminator 142 may, for example, start by comparing the fundamental frequency of certain phones to see which possible timbre is most clearly (i.e., has the highest probability of being) the match. As described previously, there are more characteristics that define the timbre other than fundamental frequency. As time goes on, the discriminator 142 learns more complex ways of identifying the voice.

Prior art speech-to-speech conversion systems known to the inventors produce poor quality conversions (e.g., the audio does not sound like the target voice). In contrast, illustrative embodiments produce significantly higher quality conversions because the generative neural network 140 (also referred to as "generator 140") and the discriminator 142 are trained using more than just the target voice 104. For example, a prior art system may be tried to convert speech from a Japanese female into the voice of Barack Obama. That prior art system gets as close to Barack Obama as it can, but it does so irrespective of how that compares to other voices. Because such a prior art system has no understanding of how we as humans discriminate between different human voices, the prior art generator may make tradeoffs that actually make the voice sound closer to someone else's voice in its quest to outsmart the prior art discriminator.

If the discriminator 142 does not detect a difference, then the process ends. However, if the discriminator 142 detects that the candidate speech segment 146 is not from the target voice 104 (e.g., the candidate voice is distinct from the target voice), an inconsistency message 148 is created. The inconsistency message 148 provides details regarding why the discriminator 142 determined that the candidate speech segment 146 was not in the target timbre 104. The discriminator 142 compares the candidate speech segment 146 to a plurality of voices (including the target 104) to determine whether the candidate speech segment 146 is in the target voice 104. For example, by comparing certain parameters of human speech defined by the plurality of voices mapped in the vector space 112, the inconsistency message 148 can determine whether the candidate speech segment 146 is within the correct parameters of human speech, or whether it falls outside what is normal human speech. Furthermore, by comparing to the plurality of voices mapped in the vector space 112, the inconsistency message 148 can provide details specifically about frequency data that has a higher probability of being from a voice other than the target voice 104. Accordingly, the vector space 112 can use this inconsistency message 148 as feedback to adjust parts of the augmented voice profile 144 and/or synthetic voice profile 138 of the target 104.

The inconsistency message 148 can provide information, for example, relating to inconsistencies (e.g., frequency data that has a high probability of not being from the target voice 104) in the number of peaks 128, the intensity of specific peaks 128, attack 129 (in FIG. 5A), decay 131 (in FIG. 5C), the harmonics 130, the fundamental frequency, the formant frequency and/or other characteristics of phones and/or analytical audio segments 124 that allow the system 100 to distinguish the candidate speech segment 146 from the target timbre 104. The inconsistency message 148 can effectively correspond to any feature of the waveforms, in highly complex combinations. The inconsistency message 148 may determine, for example, that the fourth-largest-amplitude frequency has a "suspicious" amplitude, and that some quantity should be subtracted from it to make it appear authentic. This is an extremely simplified example to illustrate the kind of information available in the inconsistency message 148.

The vector space 112 receives the inconsistency message and uses it to refine the synthetic voice profile 138 (and as a result, the augmented voice profile 144). Thus, as shown in FIG. 8B, the vector space 112 narrows and/or adjusts the set of frequency distributions that are assigned to the target voice timbre 104. The inconsistency message 148 determines inconsistencies between the candidate speech segment 146 and the target timbre 104 with reference to a plurality of timbre data. For example, the target voice 104 no longer overlaps with Conor McGregor or Barack Obama. A person of skill in the art should understand that the neural network 116 can continue to improve (e.g., narrow the representative circle in the vector space 112) beyond clear distinctions between voices. The discriminator 142 identifies the speaker, but also goes a step further to determine whether the candidate speech segment 146 has a high probability of being authentic speech (even though the speech is synthetically generated by the generator 140). For example, even if the frequency characteristics are close to a particular target (e.g., probability of Speaker A is 90 percent, probability of Speaker B is 8 percent, and probability distributed among remaining speakers is 2 percent), the discriminator 142 can determine that the frequency characteristics do not produce any recognizable human speech and are synthetic. The vector space 112 uses this data to help it better define the bounds of the augmented voice profile 144.

Refining the augmented voice profile 144 with reference to a plurality of voices provides improvements over prior art methods. These improvements include improved quality of voice conversion, which allows users to create realistic voice conversions not available using known prior art methods. Using a generative adversarial network 116 with only a single voice (e.g., the target voice) does not provide the generative adversarial neural network 116 with sufficient data to create realistic problem sets (candidate speech segment 146) that result in improved feedback (e.g., the inconsistency message 148). The improved feedback allows the system 100 to ultimately provide a much more realistic voice conversion. In some embodiments, if the discriminator 142 doesn't detect any differences between the candidate timbre and the target timbre, a null inconsistency message may be produced indicated that no differences are determined. The null inconsistency message indicates that the feedback process may come to an end. Alternatively, the system 100 may simply not produce an inconsistency message.

The revised augmented voice profile 144 is again sent to the generative neural network 140, and another (e.g., a second) candidate speech segment 146 is generated for consideration by the discriminator 142. The second candidate speech segment 146 (and so on) can be said to be in a second candidate voice (and so on). However, in some embodiments the first candidate voice and the second candidate voice may be very similar sounding from iteration to iteration. In some embodiments, the discriminator 142 may be so finely tuned that the inconsistency message 148 may detect minor differences. Thus, the first candidate voice and the second candidate voice may sound very similar to a human observer, but still can be considered different voices for purposes of this discussion.

The process continues until the discriminator cannot distinguish the candidate speech segment 146 from the target timbre 104. Accordingly, over time, the differences between the augmented voice profile 144 and the real speech of the target voice 104 should not be discernible by the discriminator 142 (e.g., probabilities that the candidate speech segment 146 is from the target voice 104 can be improved to 99+ percent, although lower percentages may suffice in certain embodiments). After the augmented voice profile 144 of the target voice 104 has been sufficiently refined, users may convert their speech segment 103 into the target voice 104.

Figure 8C:
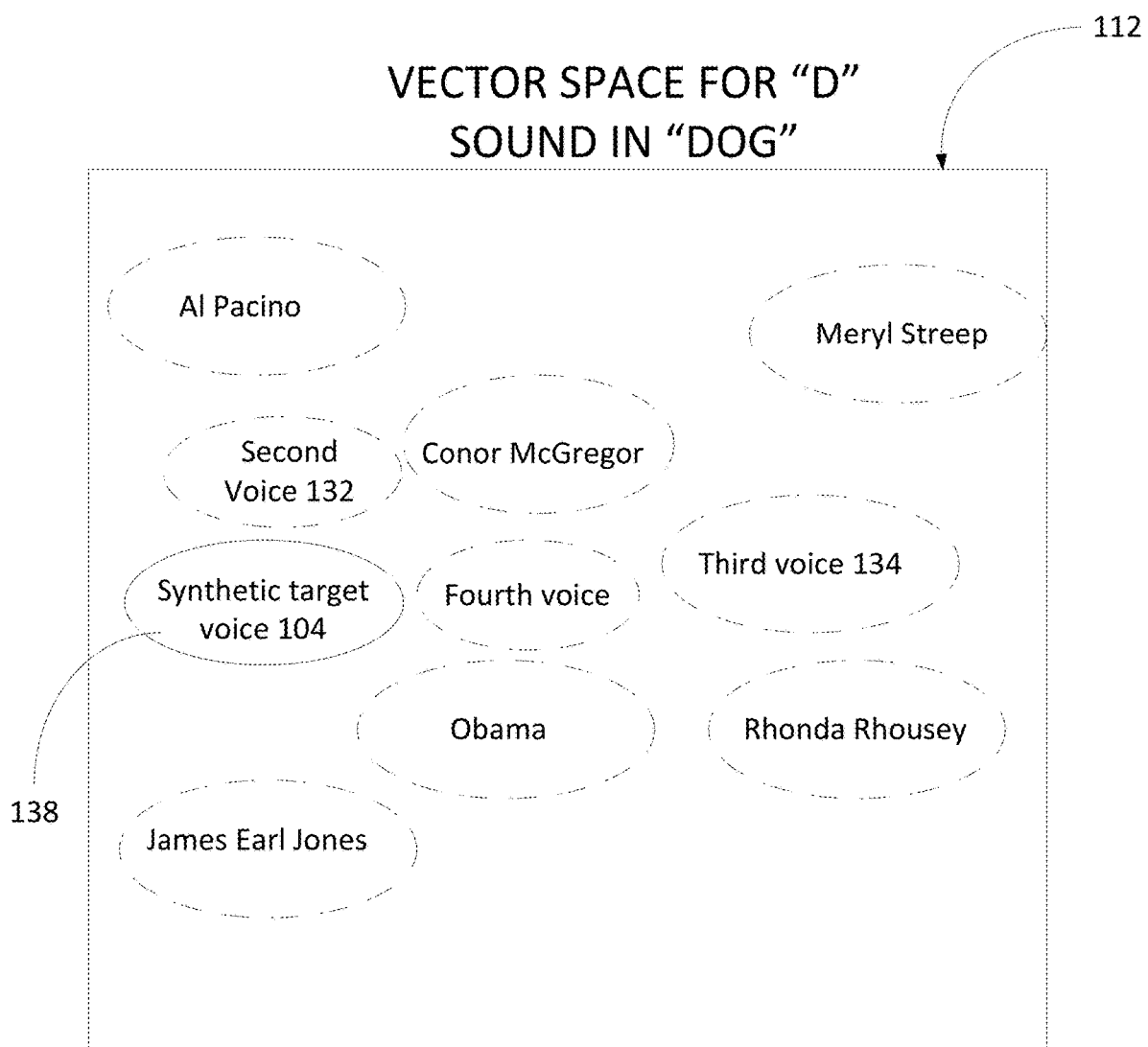
FIG. 8C schematically shows the slice of the vector space of FIG. 8B with the addition of the second voice and a fourth voice

FIG. 8C schematically shows the vector space 112 of FIG. 8B with the addition of the second voice 132 and a fourth voice. It should be noted that the addition of more voices into the vector space 112 may further enhance the ability of the discriminator 142 to distinguish between voices. In illustrative embodiments, the data from the second voice 132 and the fourth voice is used to refine the synthetic voice profile 138 for the target voice 104. Additionally, the second voice 132 and the fourth voice may assist with refining the frequency distributions of other speakers, such as Conor McGregor.

Returning to FIG. 3, the process 300 ends with step 316, which determines if there are more voices to map. If there are, the entire process is repeated for as many times as necessary. The synthetic voice profile 138 generally is improved (i.e., the possible frequency distributions and therefore the sound of the voice) by the addition of more voices into the vector space 112. However, if there are no other voices to map, the process is completed.

Illustrative embodiments create entirely new voices not previously heard, and for various combinations of voices. As described with reference to the characteristic line 136, the machine learning system 116 starts to develop certain organizational patterns for voices mapped in the vector space 112. For example, voices of a similar gender, race, and/or age may have similar frequency characteristics, and thus, are grouped together.

As described previously, the vector space 112 allows mathematical operations on the data sets within it. Accordingly, illustrative embodiments provide for mathematical operations in the vector space 112, such as a voice that is between those of Al Pacino and James Earl Jones. Additionally, the voice creation engine may use generalizations about groupings to create new voices as well. For example, a new voice may be created by subtracting an average female voice from an average Chinese female voice, and adding an average male voice.

Figure 10:
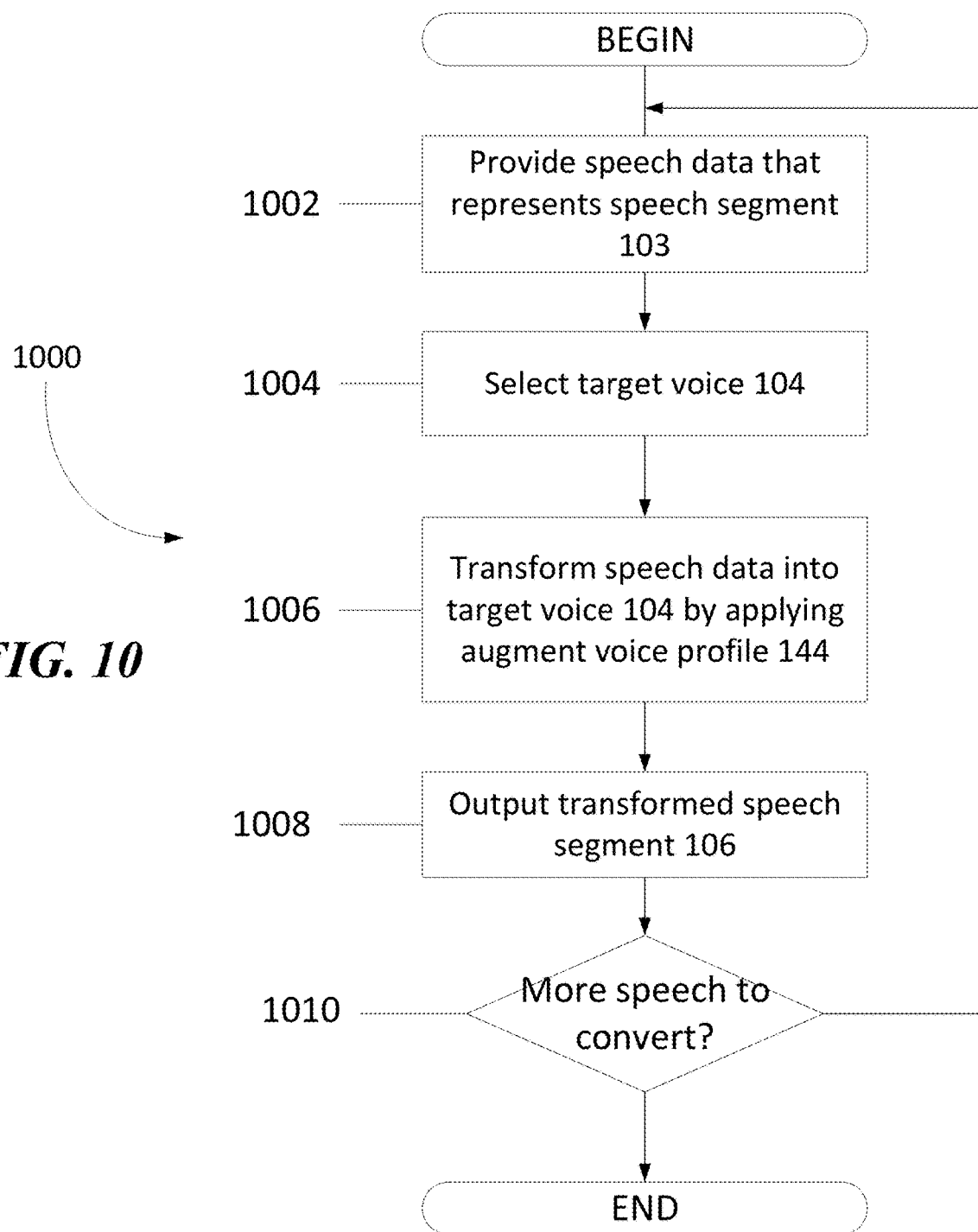
FIG. 10 shows a process for converting speech-to-speech in accordance with illustrative embodiments of the invention.

FIG. 10 shows a process 1000 for converting speech-to-speech in accordance with illustrative embodiments of the invention. It should be noted that this process is substantially simplified from a longer process that normally would be used to convert speech-to-speech. Accordingly, the process of converting speech-to-speech has many steps which those skilled in the art likely would use. In addition, some of the steps may be performed in a different order than that shown, or at the same time. Those skilled in the art therefore can modify the process as appropriate.

The process begins at step 1002, which provides speech data that represents the speech segment 103 to the system 100. For example, the speech segment 103, which inherently contains speech data that represents the speech segment 103, may be provided to the input 108. Alternatively, the generator 140 can provide data that represents a speech segment (e.g., from a text input). Thus, the speech data that represents the speech segment 103 may be in the form of audio as a waveform, a spectrogram, vocoder parameters, or other data that encodes the prosody and phone content of the speech segment 103. Furthermore, the speech data may be the output of some intermediate of the neural network 116. This output may not be understood by a normal human observer (e.g., prosody data and phone data do not have to be separated), but the neural network 116 understands the information and encodes it in a way that is understandable by the machine learning 116 or portions thereof. As described previously, the speech segment 103 does not have to come from human speech, it may be synthesized instead. Discussion further below refers to "speech segment 103" for convenience, but should be understood to encompass the broader "speech data that represents the speech segment 103."

At step 1004 the user selects the target voice 104. The target voice 104 may have been previously mapped in the vector space 112, using the process described with reference to FIG. 3. Alternatively, a new voice may be mapped into the system, also using the process described with reference to FIG. 3. In illustrative embodiments where the speech segment 103 is inputted, the speech segment 103 may, but does not have to be, used to assist with mapping the target voice 104 (e.g., the candidate speech 146 may reflect the phones, accent, and/or cadence of the speech segment 103). In step 306, the augmented voice profile 144 for the target 104 is taken and applied to the speech segment 103. In other words, the frequency of the speech segment 103 is transformed to reflect the frequency distributions present in the target voice 104. This transforms the speech segment 103 into the target voice 104.

It should be noted that during adversarial training, the generative neural network 140 takes in input speech and applies a target timbre (just as it is doing at runtime in FIG. 1), but the discriminator 142 looks at the output speech and makes a determination as to whether it is "real" human speech (although by definition, the speech will be synthetic even if the discriminator believes it is real) by the target voice 104. In contrast, during the voice conversion shown in FIG. 1, the system 100 has already been trained on enough voices that the conversion can occur rather smoothly without the need for further training, resulting in real time or near real-time speech-to-speech conversions (although further training is optional). The training set examples of real human speech by that target speaker do not have any "contamination" by any other speaker (such as the input speaker), so the generative neural network 140 learns to remove the input speaker's timbre and use the target speaker's timbre instead, otherwise the discriminator 142 is not fooled.

In step 308, the transformed speech segment 106 is output in the target voice 104. The process at step 310 then asks if there are more speech segments 103 to be converted. If there are more speech segments 103, the process 1000 repeats. Otherwise, the process is completed.

In some embodiments, the target 104 speaker may be asked to provide a pre-scripted speech sample 105. For example, there may be a script that the target is asked to read that captures many commonly pronounced, if not all, phones. Accordingly, illustrative embodiments may have authentic frequency distribution data for every phone. Furthermore, in illustrative embodiments, the vector space 112 has authentic frequency distribution data for every phone from at least one, preferably more, voices. Thus, illustrative embodiments may extrapolate synthetic voice profiles 138 at least partially on the basis of authentic data.

Although illustrative embodiments refer to the speech sample 105 as being in the target "voice" 104, it should be understood that illustrative embodiments are not limited to spoken words and/or human voices. Illustrative embodiments merely need a phone (not a part of a human word per se) in the speech sample 105, such as those produced by a musical instrument, robot, and/or animals. Thus, in illustrative embodiments, the speech sample 105 may also be referred to as an audio sample 105. These sounds can be analyzed by the system, and mapped to create a "sound profile."

It should be further understood that illustrative embodiments provide a number of advantages over the prior art. Real-time, or near real-time, voice conversion is enabled from a relatively small speech sample 105 of the target voice 104. Voice-to-voice conversion can be useful for entertainment, converting audiobook voices (e.g., in the Audible application), customizing personal voice assistants (e.g., Amazon Alexa), recreating voices of deceased actors for movies (e.g., Princess Leia from Star Wars), or artificial intelligence robots (e.g., to have a unique voice or a deceased family member's voice). Other uses might include a "photoshop for voice," where users may modify parts of their speech, or an "auto band" that uses any sound input to create different song/instrument parts and puts them together into a single band/voice. Other uses include making animals "talk," i.e., converting human speech into the timbre of a specific animal.

Figure 11:
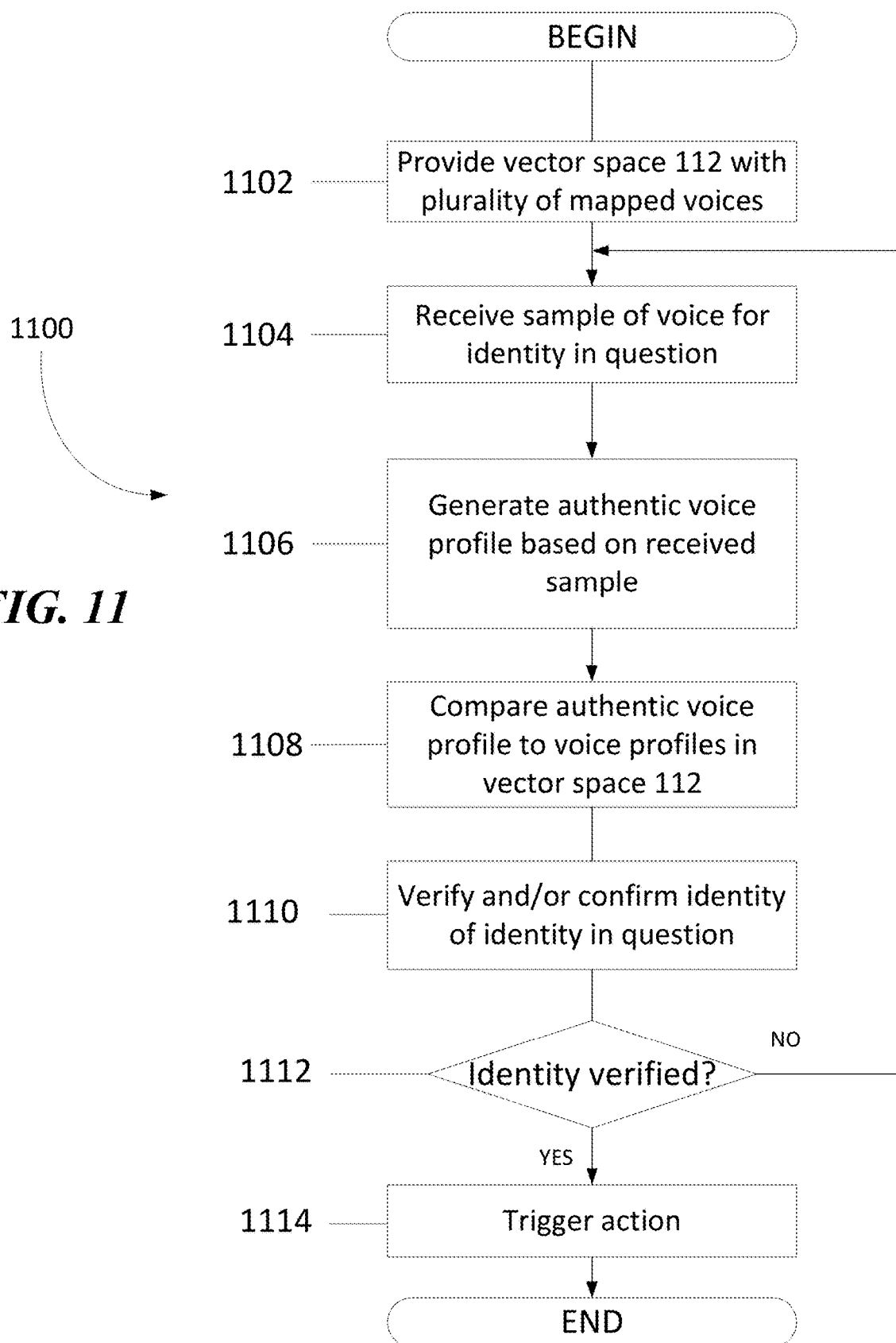
FIG. 11 shows a process of using voice to verify identity in accordance with illustrative embodiments of the invention.

FIG. 11 shows a process of using voice to verify identity in accordance with illustrative embodiments of the invention. It should be noted that, like other processes discussed above, this process is substantially simplified from a longer process that normally would be used to verify identity using voice. Accordingly, the process of verifying identity using voice has many steps which those skilled in the art likely would use. In addition, some of the steps may be performed in a different order than that shown, or at the same time. Those skilled in the art therefore can modify the process as appropriate.

The process 1100 begins at step 1102, which provides the vector space 112, which has a plurality of mapped voices. The vector space can be populated with a plurality of voices as described previously. Preferably, the vector space 112 is populated with more than 1000 voices, and each of the voices have been mapped for over 50 phones.

At step 1104, the method receives an input speech from the person whose identity is being verified. In a manner similar to how the machine learning system 116 determines if candidate speech 146 is authentic to the target 104, the machine learning system 116 can also determine if any input speech is authentic to the person whose identity is being verified. At step 1106, an authentic voice profile is generated for the person whose identity is being verified. As described previously, the voice profile may be created by filtering the analytical audio segments 124 using the temporal receptive field 114. The transformation engine 118 may extract frequency components of the analytical audio segments 124, and a frequency-to-sound correlation engine 122 may correlate the frequency components in a particular analytical audio segment with a particular sound. The machine learning 116 may then map the authentic voice profile of the target voice 104 in the database 112.

At step 1108, the process 1100 compares the authentic voice profile (and/or the augmented voice profile 144 if one has been generated) to voice profiles in the vector space 112. Similarly, any voice that is mapped in the vector space 112 can also be verified on the basis of the authentic voice profile and/or the augmented voice profile 144. On the basis of the comparison, the machine learning system 116 can determine which voice in the vector space 112, if any, corresponds to the voice of the identity in question. Thus, at step 1110, the process verifies and/or confirms the identity of the identity in question.

Step 1112 asks whether the identity is verified. In illustrative embodiments, if the voice is a 95 percent match (e.g., the discriminator provides a 95 percent confidence interval) or greater based on frequency distribution, the voice is verified. In some embodiments, the voice may have to be at least a 99 percent confidence that the speech corresponds to the identities voice, compared to other voices in the system (referred to as a "match") to be verified. In some other embodiments, the voice may have to be at least a 99.9 percent match to verified. In further embodiments, the voice may have to be at least a 99.99 percent match to be verified. If the voice is not verified, the process may request to receive another sample of the voice, returning to step 1104. However, if the voice is verified, the process 1100 proceeds to step 1114, which triggers an action.

The action triggered at step 1114 may be, for example, unlocking a password. The system 100 may compare voices and determine the authenticity/identity of particular speech. Accordingly, the system 100 enables the use of voice passwords. For example, a newer version of the IPHONE mobile telephone may utilize voice verification to unlock the phone (e.g., in addition or alternatively to face recognition and/or fingerprint scanning). The system 100 analyzes the speech (e.g., compares it to a number of voices previously mapped by Apple in the vector space 112) and unlocks the smartphone if the voice is a match. This provides increased ease of use and security.

In illustrative embodiments the triggered action unlocks and/or provides a signal that the voice has permission for control of smart home applications. For example, commands to lock and/or unlock a door, turn on kitchen appliances, etc. can all be verified and validated as being from a voice with the proper access (e.g., the owner). Illustrative embodiments may be incorporated into a smart home assistant (e.g., Amazon Alexa) and allow for verification of commands. This includes enabling use of Amazon Alexa for sensitive technologies, such as bank transfers, large transfers, or access to private information (e.g., medical records) by confirming the user's voice.

Furthermore, illustrative embodiments may be integrated into identification systems (e.g., police and/or airport) and point of sale systems (e.g., registers at stores) for easy verification of identify. Thus, at point of sale systems, the triggered action may be that users pay with their voice, using a payment command (e.g., "pay $48.12").

Optionally, to combat potential misuse of speech-to-speech conversion technology, the system 100 may add frequency components ("watermark") that can be easily detected to prove that the speech sample is inauthentic (i.e., manufactured). This can be accomplished by, for example, adding low frequency sounds that are inaudible by human beings. Accordingly, the watermark may be imperceptible by humans.

While the invention is described through the above-described exemplary embodiments, modifications to, and variations of, the illustrated embodiments may be made without departing from the inventive concepts disclosed herein. Furthermore, disclosed aspects, or portions thereof, may be combined in ways not listed above and/or not explicitly claimed. Accordingly, the invention should not be viewed as being limited to the disclosed embodiments.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as a pre-configured, stand-along hardware element and/or as preprogrammed hardware elements (e.g., application specific integrated circuits, FPGAs, and digital signal processors), or other related components.

In an alternative embodiment, the disclosed apparatus and methods (e.g., see the various flow charts described above) may be implemented as a computer program product for use with a computer system. Such implementation may include a series of computer instructions fixed either on a tangible, non-transitory medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

The embodiments of the invention described above are intended to be merely exemplary; numerous variations and modifications will be apparent to those skilled in the art. Such variations and modifications are intended to be within the scope of the present invention as defined by any of the appended claims.

What is claimed is:

1. A timbre vector space construction system for modifying or outputting a timbre vector space, the space construction system comprising:
    an input configured to receive:
        (a) first speech data that is a function of a first speech segment, the first speech segment:
            having first timbre data, and
            being in a first voice, and
        (b) second speech data that is function of a second speech segment, the second speech segment:
            having second timbre data, and
            being in a second voice;
    a temporal receptive field configured to transform the first speech data representing the first speech segment into a first plurality of smaller analytical speech data segments, each of the first plurality of smaller analytical speech data segments having a frequency distribution representing a portion of the first timbre data,
    the temporal receptive field configured to transform the second speech data representing the second speech segment into a second plurality of smaller analytical speech data segments, each of the second plurality of smaller analytical speech data segments having a frequency distribution representing a portion of the second timbre data,
    a machine learning system running on at least one processor and configured to map the first voice relative to the second voice in the timbre vector space as a function of the frequency distribution of (a) the first plurality of analytical speech data segments transformed from the first speech segment and (b) the second plurality of analytical speech data segments transformed from the second speech segment.

2. The system as defined by claim 1, wherein the input is configured to receive third speech data that is a function of a third speech segment, the third speech segment;
    having third timbre data, and
    being in a third voice, and
    the machine learning system is configured to transform, using a temporal receptive field, the third speech data representing the third speech segment into a third plurality of smaller analytical speech data segments and to map the third voice relative to the first voice and the second voice in the vector space.

3. The system as defined by claim 2, wherein mapping the third voice relative to the first voice and the second voice changes the relative position of the first voice to the second voice in the vector space.

4. The system as defined by claim 1, wherein the system is configured to map each human phoneme in the English language in at least one voice.

5. The system as defined by claim 1, wherein the temporal receptive field is sufficiently small so as not to capture speech rate and/or accent of the voice.

6. The system as defined by claim 1, wherein the temporal receptive field is between about 10 milliseconds and about 2,000 milliseconds.

7. A method of modifying or outputting a timbre vector space for transforming speech segments comprises:
    receiving a) first speech data that is a function of a first speech segment, including first timbre data, in a first voice and b) second speech data that is a function of a second speech segment, including second timbre data, in a second voice;
    filtering, using a temporal receptive field:
        (a) the first speech data into a first plurality of smaller analytical speech data segments, and
        (b) the second speech data into a plurality of second smaller analytical speech data segments,
        each of the first plurality of smaller analytical speech data segments having a frequency distribution representing at least a portion of the first timbre data, and each of the second plurality of smaller analytical speech data segments having a frequency distribution representing at least a portion of the second timbre data;
    mapping, using a machine learning system running on at least one processor, the first voice relative to the second voice in a vector space as a function of the frequency distributions in at least one of the first plurality of analytical speech data segments from the first speech data and at least one of the second plurality of analytical speech data segments from the second speech data.

8. The method as defined by claim 7, further comprising means for filtering each of the first speech data and the second speech data.

9. The method as defined by claim 7, further comprising means for mapping the first voice relative to the second voice.

10. The method as defined by claim 7, wherein the filtering is performed by a machine learning system.

11. The method as defined by claim 7, further comprising:
    receiving a third speech that is a function of a third speech segment, including third timbre data, in a third voice;
    filtering, using the temporal receptive field, the third speech data into a third plurality of smaller analytical speech segments; and
    mapping the third voice relative to the first voice and the second voice in the vector space.

12. The method as defined by claim 11, further comprising:
    adjusting the position of the first voice relative to the second voice in the vector space as a function of mapping the third voice.

13. The method as defined by claim 7, wherein the receptive field is sufficiently small so as not to capture speech rate and/or accent of the voice.

14. The method as defined by claim 7, further comprising:
    mapping each human phoneme in the English language in at least one voice.

15. The method as defined by claim 7, wherein the temporal receptive field is between about 10 milliseconds and about 500 milliseconds.

16. A computer program product for use on a computer system for modifying or outputting a timbre vector space, the computer program product comprising a tangible, non-transient computer usable medium having computer readable program code thereon, the computer readable program code comprising:

program code for causing an input to receive a) first speech data that is a function of a first speech segment, including first timbre data, in a first voice, and b) second speech data that is a function of a second speech segment, including second timbre data, in a second voice;

program code for filtering, using a temporal receptive field:

(a) the first speech data into a first plurality of smaller analytical speech data segments, and (b) the second speech data into a second plurality of smaller analytical speech data segments, each of the first plurality of smaller analytical speech data segments having a frequency distribution representing the first timbre data, and each of the second plurality of smaller analytical speech data segments having a frequency distribution representing the second timbre data; and program code for causing a machine learning system running on at least one processor to map the first voice relative to the second voice in a vector space as a function of the frequency distributions in at least one of the first plurality of analytical speech data segments from the first speech data and at least one of the second plurality of analytical speech data segments from the second speech data.

17. The computer program product of claim 16, further comprising means for filtering each of the first speech data and the second speech data.

18. The computer program product of claim 16, further comprising means for mapping the first voice relative to the second voice in the vector space.

19. The computer program product of claim 16, further comprising:

program code for causing an input to receive c) a third speech data that is a function of a third segment, including third timbre data, in a third voice; and program code for filtering, using the temporal receptive field, the third speech data into a third plurality of smaller analytical speech data segments.

20. The computer program product of claim 19, further comprising:

program code for mapping the third voice relative to the first voice and the second voice in the vector space, wherein mapping the third voice relative to the first voice and the second voice changes the relative position of the first voice to the second voice in the vector space.

21. The computer program product of claim 16, further comprising:

program code configured to define the temporal receptive field so as to not capture speech rate and/or accent of the voice.

22. The computer program product of claim 21, wherein the temporal receptive field is between about 10 milliseconds and about 500 milliseconds.

23. The system as defined by claim 1, wherein the first speech data is the first speech segment.

24. The system as defined by claim 1, wherein the transform comprises filtering.

* * * * *